US009763306B2

(12) United States Patent
Sachs et al.

(10) Patent No.: US 9,763,306 B2
(45) Date of Patent: Sep. 12, 2017

(54) DYNAMIC SPATIALLY-RESOLVED LIGHTING USING COMPOSITED LIGHTING MODELS

(71) Applicant: SENSITY SYSTEMS INC., Sunnyvale, CA (US)

(72) Inventors: Christopher David Sachs, Sunnyvale, CA (US); Peter Raymond Florence, Saratoga, CA (US)

(73) Assignee: Sensity Systems Inc., Sunnyvale, CA (US)

( * ) Notice: Subject to any disclaimer, the term of this patent is extended or adjusted under 35 U.S.C. 154(b) by 165 days.

(21) Appl. No.: 14/576,487

(22) Filed: Dec. 19, 2014

(65) Prior Publication Data

US 2015/0181678 A1 Jun. 25, 2015

Related U.S. Application Data

(60) Provisional application No. 61/919,089, filed on Dec. 20, 2013.

(51) Int. Cl.
*H05B 37/02* (2006.01)
(52) U.S. Cl.
CPC ..... *H05B 37/0218* (2013.01); *H05B 37/0272* (2013.01); *Y02B 20/46* (2013.01)
(58) Field of Classification Search
CPC ............ H05B 37/0272; H05B 37/0218; H05B 37/0227; H05B 37/0245
See application file for complete search history.

(56) References Cited

U.S. PATENT DOCUMENTS 7,696,895 B2  4/2010 Harwood
8,732,031 B2  5/2014 Martin et al.
(Continued)

FOREIGN PATENT DOCUMENTS

TW       201531164 A    8/2015
WO   WO-2004004423 A2   1/2004
WO   WO-2015095645 A1   6/2015

OTHER PUBLICATIONS

"International Application Serial No. PCT/US2014/071375, International Prelminary Report on Patentability mailed Jun. 30, 2016", 10 pgs.

(Continued)

*Primary Examiner* — Tuyet Vo

(57) ABSTRACT

Methods, devices, systems, and non-transitory process-readable storage media for controlling lighting nodes of a lighting system associated with a lighting infrastructure based on composited lighting models. An embodiment method performed by a processor of a computing device may include operations for obtaining a plurality of lighting model outputs generated by lighting control algorithms that utilize sensor data obtained from one or more sensor nodes within the lighting infrastructure, combining the plurality of lighting model outputs in an additive fashion to generate a composited lighting model, calculating lighting parameters for a lighting node within the lighting infrastructure based on the composited lighting model and other factors, and generating a lighting control command for configuring the lighting node within the lighting infrastructure using the calculated lighting parameters. The method may be performed by any combination of lighting node(s), sensor node(s), a remote server, and/or other devices within the lighting infrastructure.

18 Claims, 20 Drawing Sheets

(56) References Cited

U.S. PATENT DOCUMENTS

| | | |
|---|---|---|
| 2009/0267540 A1 | 10/2009 | Chemel et al. |
| 2012/0223646 A1 | 9/2012 | Recker et al. |
| 2012/0229048 A1* | 9/2012 | Archer ............... H05B 37/0245 |
| | | 315/297 |
| 2013/0134886 A1 | 5/2013 | Golding et al. |
| 2014/0084795 A1 | 3/2014 | Cumpston et al. |
| 2016/0295658 A1* | 10/2016 | Chraibi ............. H05B 33/0845 |
| 2016/0360594 A1* | 12/2016 | Chemel ............. H05B 37/0218 |

OTHER PUBLICATIONS

"International Application Serial No. PCT/US2014/071375, International Search Report mailed Mar. 30, 2015", 4 pgs.
"International Application Serial No. PCT/US2014/071375, Written Opinion mailed Mar. 30, 2015", 8 pgs.
Porter, Thomas, et al., "Compositing Digital Images", Computer Graphics, vol. 18, No. 3, (Jul. 1984), 253-259.

\* cited by examiner

Time step 1 (Directional lighting control algorithm)

Time step 2 (Directional lighting control algorithm)

DYNAMIC SPATIALLY-RESOLVED LIGHTING USING COMPOSITED LIGHTING MODELS

RELATED APPLICATIONS

The present application claims the benefit of priority to U.S. Provisional Application No. 61/919,089, entitled "Systems and Methods for Dynamic Spatially Resolved Lighting" filed Dec. 20, 2013, the entire contents of which are hereby incorporated by reference.

BACKGROUND

Smart lighting systems offer the opportunity to significantly increase the utility of a lighting infrastructure. Such systems may, for example, decrease energy consumption by dynamically lowering the output of lights when light is not needed in at certain luminosity levels or at all. It is difficult, however, to appropriately adjust light levels to maximize energy savings without negatively impacting the human experience of the light. This difficulty is exacerbated by the limitations of sensors, as all sensors typically have limited range, accuracy, and reliability. Without significant tools, manual light level optimizations may be laborious and time-intensive.

SUMMARY

Various embodiments provide methods, devices, systems, and non-transitory process-readable storage media for controlling lighting nodes of a lighting system associated with a lighting infrastructure based on composited lighting models. In some embodiments, a computing device may be configured to combine or composite together one or more lighting model outputs obtained from disparate lighting control algorithms that are driven by sensor data from sensor nodes within the lighting infrastructure. For example, the computing device may perform operations for combining, aggregating, and/or otherwise compositing together one or more lighting model datasets from one or more lighting control algorithms in an additive fashion. Such compositing operations may create a continuous model (i.e., a composited lighting model) that illustrates the ideal lighting in the lighting infrastructure based on all the lighting control algorithms. For example, the composited lighting model may illustrate the ideal lighting in a parking deck based on daylight harvesting, occupancy, ambient light, directional lighting, and other concurrent objectives. The computing device may then use location coordinates of discrete, arbitrary lighting nodes within the lighting infrastructure relative to the composited lighting model to identify their individual lighting parameters (or "sampled values") needed to approximate the ideal lighting indicated by the composited lighting model. With the identified lighting parameters, the computing device may direct the lighting nodes to configure their lighting elements (e.g., LED, bulbs, etc.), such as by transmitting lighting control command messages via network communications. The computing device may repeatedly obtain updated lighting model outputs, perform composited lighting models, and generate lighting commands at a regular interval (e.g., every few seconds, etc.) to configure the lighting nodes in a dynamic manner. In this way, disparate lighting control algorithms may each contribute to (or "nudge") eventual lighting within the lighting infrastructure without directly controlling individual lighting node configurations.

An embodiment method for a computing device to generate lighting control commands for lighting nodes of a lighting system associated with a lighting infrastructure may be performed by a processor of the computing device and may include operations for obtaining a plurality of lighting model outputs generated by lighting control algorithms that utilize sensor data obtained from one or more sensor nodes within the lighting infrastructure, combining the plurality of lighting model outputs in an additive fashion to generate a composited lighting model, calculating lighting parameters for a lighting node within the lighting infrastructure based on the composited lighting model and other factors, and generating a lighting control command for configuring the lighting node within the lighting infrastructure using the calculated lighting parameters. In some embodiments, the plurality of lighting model outputs may be received from other devices associated with the lighting system.

In some embodiments, the method may further include receiving the sensor data obtained from the one or more sensor nodes within the lighting infrastructure, and performing the lighting control algorithms using the received sensor data to generate the plurality of lighting model outputs. In some embodiments, each of the plurality of lighting model outputs may indicate an ideal lighting within the lighting infrastructure with relation to a particular objective. In some embodiments, the particular objective may include one or more of directed lighting, path routing, and presence detection. In some embodiments, each of the plurality of lighting model outputs may indicate an ideal lighting within the lighting infrastructure over a period of time with relation to the particular objective.

In some embodiments, combining the plurality of lighting model outputs in the additive fashion to generate the composited lighting model may include combining mathematical representations of each of the plurality of lighting model outputs. In some embodiments, combining the mathematical representations may include combining nodes of a tree using an "over" operator. In some embodiments, combining the plurality of lighting model outputs may include using light blending techniques.

In some embodiments, the other factors may include a location for the lighting node within the lighting infrastructure and a time. In some embodiments, calculating the lighting parameters for the lighting node within the lighting infrastructure based on the composited lighting model and the other factors may include comparing the location for the lighting node to the composited lighting model to identify a sampled value for the lighting node. In some embodiments, the other factors may include characteristics of the lighting node, wherein the characteristics may include a maximum luminosity level, a number of LEDs, a manufacturer, and a model type.

In some embodiments, the lighting control command may indicate a luminosity level to be used at the lighting node, wherein the luminosity level may be a luminosity configuration inclusively between no luminosity and full luminosity. In some embodiments, the method may further include syncing the plurality of lighting model outputs in time. In some embodiments, the method may further include transmitting the generated lighting control command to the lighting node. In some embodiments, the computing device may be one of a remote server, the lighting node, a sensor node, or a local computing device within the lighting infrastructure. In some embodiments, the computing device may be the lighting node, the method may further include configuring a local lighting element based on the generated lighting control command.

In some embodiments, obtaining the plurality of lighting model outputs generated by the lighting control algorithms that utilize the sensor data obtained from the one or more sensor nodes within the lighting infrastructure may include one or more of updating one or more of the plurality of lighting model outputs, removing one or more of the plurality of lighting model outputs, and adding one or more new lighting model outputs. In some embodiments, obtaining the plurality of lighting model outputs generated by the lighting control algorithms that utilize the sensor data obtained from the one or more sensor nodes within the lighting infrastructure may include determining whether a first lighting model output of the plurality of lighting model outputs has an indefinitely null value, and removing the first lighting model output from the plurality of lighting model outputs in response to determining the first lighting model output has the indefinitely null value. In some embodiments, the method may further include determining whether a sample time has expired, and wherein combining the plurality of lighting model outputs in the additive fashion to generate the composited lighting model may include combining the plurality of lighting model outputs in the additive fashion to generate the composited lighting model in response to determining the sample time has expired, and wherein calculating lighting parameters for the lighting node within the lighting infrastructure based on the composited lighting model and the other factors may include calculating lighting parameters for the lighting node within the lighting infrastructure based on the composited lighting model and the other factors in response to determining the sample time has expired.

Further embodiments include a computing device configured with processor-executable instructions for performing operations of the methods described above. For example, in some embodiments, a computing device, comprising a processor configured with processor-executable instructions for performing operations that may include obtaining a plurality of lighting model outputs generated by lighting control algorithms that utilize sensor data obtained from one or more sensor nodes within a lighting infrastructure, combining the plurality of lighting model outputs in an additive fashion to generate a composited lighting model, calculating lighting parameters for a lighting node within the lighting infrastructure based on the composited lighting model and other factors, and generating a lighting control command for configuring the lighting node within the lighting infrastructure using the calculated lighting parameters.

Further embodiments include a computing device configured with means for performing operations of the methods described above. For example, in some embodiments, a computing device may include means for obtaining a plurality of lighting model outputs generated by lighting control algorithms that utilize sensor data obtained from one or more sensor nodes within a lighting infrastructure, means for combining the plurality of lighting model outputs in an additive fashion to generate a composited lighting model, means for calculating lighting parameters for a lighting node within the lighting infrastructure based on the composited lighting model and other factors, and means for generating a lighting control command for configuring the lighting node within the lighting infrastructure using the calculated lighting parameters.

Further embodiments include a non-transitory processor-readable medium on which is stored processor-executable instructions configured to cause a computing device to perform operations of the methods described above. For example, in some embodiments, a non-transitory processor-readable storage medium having stored thereon processor-executable instructions configured to cause a processor of a computing device to perform operations that may include obtaining a plurality of lighting model outputs generated by lighting control algorithms that utilize sensor data obtained from one or more sensor nodes within a lighting infrastructure, combining the plurality of lighting model outputs in an additive fashion to generate a composited lighting model, calculating lighting parameters for a lighting node within the lighting infrastructure based on the composited lighting model and other factors, and generating a lighting control command for configuring the lighting node within the lighting infrastructure using the calculated lighting parameters.

Further embodiments include a communication system including a computing device configured with processor-executable instructions to perform operations of the methods described above. For example, in some embodiments, a communication system (e.g., a lighting system) associated with a lighting infrastructure (e.g., a parking garage, etc.) may include a computing device (e.g., a server or remote server) including a processor configured with processor-executable instructions for performing operations of the methods described above, one or more sensor nodes configured to obtain sensor data related to the lighting infrastructure, and/or one or more lighting nodes configured to emit light based on data received from the computing device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to various electronic devices equipped with at least one processing unit (or processor). Examples of computing devices may include any one or all of mobile devices (e.g., cellular telephones, smart-phones, web-pads, tablet computers, Internet enabled cellular telephones, Wi-Fi® enabled electronic devices, personal data assistants (PDA's), laptop computers, etc.), servers, and personal computers. In various embodiments, such devices may be configured with a network transceiver to establish a wide area network (WAN) connection (e.g., a cellular network connection, etc.) and/or local area network (LAN) connection (e.g., Wi-Fi®, etc.).

Figure 15:
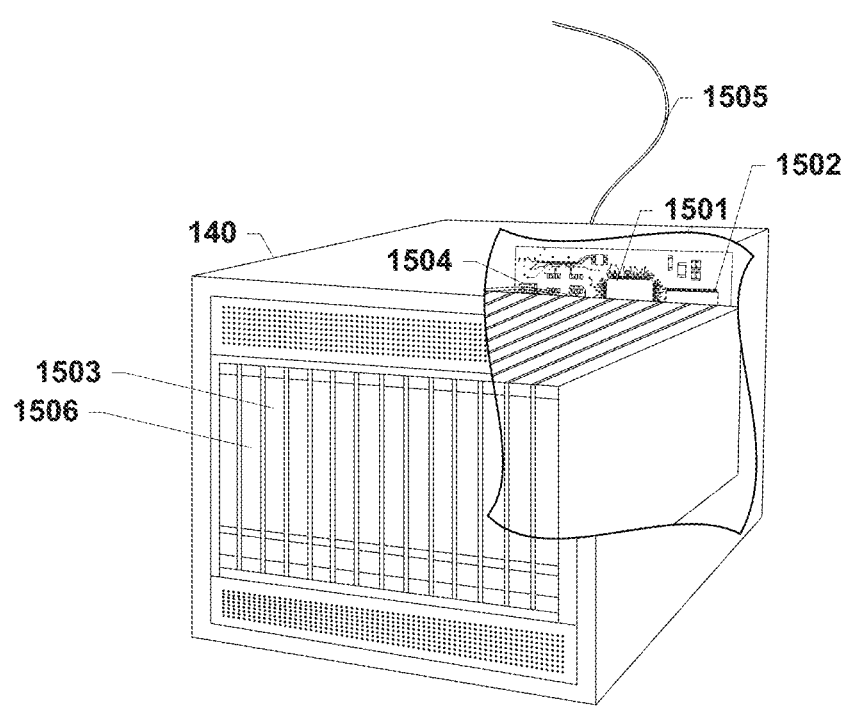
FIG. 15 is a component block diagram of a server computing device suitable for use in various embodiments.

The term "server" is used to refer to any computing device capable of functioning as a server, such as a master exchange server, web server, mail server, document server, and a personal or mobile computing device configured with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application). An exemplary server is described below with reference to FIG. 15.

The term "sensor node" is used herein to refer to a computing device within a lighting system associated with a lighting infrastructure (e.g., a parking deck, etc.) that includes or is otherwise is configured to utilize one or more sensor units for collecting sensor data. Such sensor units may include, but not be limited to, motion sensors, heat sensors, ambient light sensors, video sensors (e.g., cameras, etc.), and audio sensors (e.g., microphones, etc.). Exemplary components of a sensor node are described below with reference to FIG. 14A. Although the term "sensor node" may be used herein to refer to any device with sensor functionalities/units, it should be appreciated that such a device may also have other functionalities (e.g., lighting elements, etc.).

The term "lighting node" is used herein to refer to a computing device within a lighting system associated with a lighting infrastructure (e.g., a parking deck, etc.) that is configured to control or otherwise provide lighting within the lighting infrastructure. Lighting nodes may include and/or may otherwise be coupled to lighting elements (i.e., light sources such as light-emitting diodes (LEDs), light bulbs, etc.). Accordingly, lighting nodes may also be referred to as luminaires or light fixtures. Exemplary components of a lighting node are described below with reference to FIG. 14B. Although the term "lighting node" may be used herein to refer to any device with lighting functionalities, it should be appreciated that such a device may also have other functionalities (e.g., sensor units, etc.).

In various embodiments, lighting infrastructures may include any combination of dedicated sensor nodes, dedicated lighting nodes, and/or nodes with functionalities for both lighting nodes and sensor nodes. For simplicity, such multi-purpose devices may be referred to herein as "combination lighting nodes". For example, a combination lighting node may be configured with both sensor units (e.g., motion detectors, etc.) as well as a light source (e.g., one or more LEDs, etc.). Further, sensor nodes and lighting nodes may or may not be located coincident to one another within lighting infrastructures. As used herein, combination lighting nodes may also refer to dedicated sensor nodes and lighting nodes that are collocated but distinct devices (e.g., a sensor node placed on top of, next to, within a lighting node, etc.).

The term "lighting control algorithm" is used herein to describe an instruction set, application, routines, and/or other operations that are performed by a computing device (e.g., a remote server, a lighting node, a sensor node, a local computing device within a lighting infrastructure, etc.) to generate data indicating how light within a lighting infrastructure should be configured to accomplish a particular objective (e.g., ideal lighting for a lighting objective). Some examples of such objectives of lighting control algorithms may include providing directed lighting, path routing, daylight harvesting, and presence detection. For example, lighting control algorithms may utilize operations for using presence data to determine lighting and dimming values, using motion data to predict directed lighting, and using ambient lighting to determine daylight harvesting lighting. Output data generated from the performance of lighting control algorithms may be referred to herein as "lighting model output(s)". In general, when executed by processor(s) of computing device(s), lighting control algorithms may take at least sensor data from sensor nodes as input in order to generate lighting model output(s). Such lighting model outputs may be generated without knowledge of lighting nodes in a lighting infrastructure, and may be considered continuous model data. As described herein, lighting model outputs may be queried to identify how an individual lighting node may be configured based on at least its location within a lighting infrastructure and a time. For example, lighting model outputs may be lighting functions that may output lighting node configuration data based on input values, such as spatial variables (e.g., x, y, z coordinates) and temporal variables (e.g., time or 't') as described below. In some embodiments, lighting model outputs may be representations of Bezier curves or splines that may be mathematically combined together.

The various embodiments provide methods, devices, systems, and non-transitory process-readable storage media for providing a dynamic spatially-resolved framework for controlling the configurations of lighting nodes within a lighting infrastructure by combining computed lighting models in order to improve energy usage while optimally using light as desired. Embodiment techniques may create light patterns via lighting node configurations (e.g., luminosity settings, etc.) that closely match the combined needs of people and protocols within the lighting infrastructure. Further, as any number of objectives may be accomplished via various supported lighting control algorithms executed by devices within the framework, the spatially-resolved (or geospatially-resolved) framework may also expand the use of the lighting infrastructure as a means of communication (e.g., indicate dynamic pathways via lighting node outputs). Various embodiments may utilize geo-tagged lighting nodes (e.g., light fixtures, luminaires, etc.), distributed sensor nodes, embedded networking capabilities, computing power, various algorithms (including learning algorithms), geospatial analysis, and software interfaces for control or providing additional inputs.

In general, embodiment lighting systems may incorporate a plurality of lighting nodes, each having configurable light outputs (e.g., luminosity settings or configurations) that are uniquely dependent on a multitude of inputs, including sensory information that is collected throughout the lighting infrastructure by one or more sensor nodes. Such systems may utilize a continuous coordinate system wherein each lighting node is assigned a unique location (e.g., x, y, z coordinates relative to the lighting infrastructure). Once established in a spatially-resolved framework, a variety of mathematical relations may be evaluated by a computing device (e.g., a remote server) to optimize lighting levels with the aid of sensory inputs from the sensor nodes (e.g., motion sensors, heat sensors, ambient light sensors, video sensors, and audio sensors.).

Further, such lighting systems may include communication network(s) that allow the transfer of information to and from each lighting node within lighting infrastructures. Once spatially-resolved information is collected, various computing devices within the lighting systems may be configured to execute various mathematical relations to assign lighting outputs at each lighting node in order to create desired lighting. For example, lighting node configurations may either be generated locally within the lighting infrastructure, or may be communicated to and performed on remotely-located processors (e.g., by the "cloud"). Such communicated light outputs by configured lighting nodes may serve various objectives, such as allowing humans to optimally see within an area, using light accentuation as a form of communication, and/or adjusting light areas for the use of cameras, other optical sensors, robots, and other animals that may be in an area.

In various embodiments, to create light output (via lighting node configurations) that are ideal for various objectives within the lighting infrastructure, computing devices of the system may perform lighting control algorithms that take sensory inputs and produce continuous, time-varying light images (i.e., lighting model outputs). Such lighting model outputs may indicate values of desired luminosity at each point in space. Lighting model outputs may then be realized by appropriately adjusting light output at each lighting node dependent on its spatial coordinates. The algorithmic framework may enable both the (i) generation of meaningful signals based on different input criteria (e.g., presence, historical behavior, etc.) and (ii) the implementation of those signals into approximating an appropriate distributed light array. The algorithmic framework may also enable the compositing of multiple lighting model outputs (e.g., light functions) to produce a unified light image (i.e., a composited lighting model) that smoothly blends the output of multiple contributing functions. Resulting light output of lighting nodes may either be of discrete levels (e.g., bi-level dimming) or may approximate an ideal light image by varying the light level over a continuous spectrum. For example, to achieve optimally desired lighting, light output at lighting nodes may be normalized for factors that affect luminance, such as fixture height from the ground.

Various lighting control algorithms may be executed by various devices within a lighting infrastructure and/or generally associated with the lighting system. The following are examples of some mathematical relations that may be employed by such lighting control algorithms: (i) defining lighting levels as spatial and temporal functions related to some sensory input, (ii) assigning or employing an algorithm to learn unique parameters that alter light functions uniquely for each light, (iii) computing vectors (e.g., from the sensory detection of the velocity of a moving person, car, or other object) and preemptively projecting lighting requirements in front of movement, and/or (iv) conducting complex trail analysis to evoke trends and inform lighting patterns.

In some embodiments, a particular lighting control algorithm (e.g., a directed lighting control algorithm) may be configured to generate a lighting model output that acts as an active form of communicating information. For example, such a lighting model output may highlight the location of a car within a parking garage, indicate the best route of entrance or exit, including in case of an emergency where spatially resolved sensors may have detected a threat such as a fire, smoke, or hazardous gases, or indicate an optimal route for special persons or vehicles, such as an ambulance. The communication of information may be achieved by changing the light output at specific lights, including using time-dependent changes to indicate directionality. In some embodiments, the use of lights as forms of communication may be aided by the communication of other components incorporated into networked lighting fixtures, including audio speakers. In other words, the output information from embodiment techniques may include commands for lighting nodes within an infrastructure as well as other associated output devices. For example, a lighting node may receive lighting control commands from the remote server indicating a particular luminosity setting to institute at a certain time, as well as a certain audio file to render via a coupled speaker.

In some embodiments, learning algorithms may be employed to use the sum of information collected over time in order to further optimize lighting output at lighting nodes. In particular, machine learning routines or logic may be utilized in combination with various lighting control algorithms and/or compositing operations to improve or adjust lighting model outputs and thus improve how lighting nodes may best be controlled based on received sensor data. The use of such algorithms may be conducted periodically to minimize computational stress. In some embodiments, database(s) may be used to collect the sum of this information across various lighting infrastructures, and further analysis may be conducted by a computing device in order to predict optimal lighting conditions for new locations. For example, a computing device storing within databases and analyzing sensor data over time may improve inferences of pedestrians' intended paths through a lighting infrastructure.

In some embodiments, dynamic spatially-resolved lighting systems as described herein may be partially controlled and/or visually represented by the use of software interfaces, such as applications executing on user mobile computing devices. Such interfaces may be used to show both dynamic and geospatial information about lighting infrastructures. For example, a graphical user interface (GUI) may be rendered on a mobile computing device that enables a user to see lighting output and sensory input that is animated dynamically, as well as the locations of lights and sensory inputs.

Various embodiments may provide a dynamic spatially resolved lighting system where light output of any given light may be uniquely dependent on a variety of inputs. Such a dynamic spatially resolved lighting system may be defined as a lighting infrastructure in which each light (or lighting node) may be location-aware, and the location positions (or coordinates) within the lighting infrastructure may be used to computationally determine variant light output over time in a desired manner. Embodiment methods may be performed by one or more computing devices to manipulate such lighting nodes of such a dynamic spatially-resolved lighting system. In some embodiments, the lighting system may utilize a continuous coordinate system (i.e., Cartesian, cylindrical, etc.) as a basis for spatially resolved information. In some embodiments, unique geospatial positions may be assigned to each light of the lighting system.

In some embodiments, the lighting system may include a communication network and remotely located processors (i.e. the "cloud") to compute lighting levels for individual lights based on location-specific sensor inputs. In some embodiments, the lighting system may include a communication network and embedded, local (on-site) processors to compute lighting levels for individual lights based on location-specific sensor inputs.

In some embodiments, the lighting system may include sensor nodes configured to provide sensory inputs, including but not being limited to motion sensors, heat sensors, ambient light sensors, video sensors, and audio sensors.

Methods performed by computing devices of embodiment lighting systems may include operations for utilizing mathematical relations in order to compute optimal lighting output at each location. In some embodiments, lighting levels may be defined as spatial and temporal functions related to some spatially resolved sensory input. In some embodiments, such methods may include compositing multiple time-varying spatial light functions into a single time-varying spatial light function that models the desired light output of each point in a geospatial analog space. In some embodiments, such methods may include sampling a continuous spatial light function at discrete points corresponding to the location of lights, and at regular or irregular time intervals, so as to approximate and animate a continuous, time-varying light function through temporal variation of the light output of individual lights. In some embodiments, the light output may change as a function of distance from a point, and time since an event.

In some embodiments, such methods may include dynamically adding, removing, and replacing terms of a composited function in response to sensory or analytical input. In some embodiments, such methods may include synchronizing the evaluation of continuous, time-varying spatial light function having computed values that are used by a lighting control algorithm to simultaneously affect the light output of multiple lights. In some embodiments, such methods may include interpolating the sampled values of a continuous spatial light function between points in time so as to smoothly animate light output changes with minimal computational and control overhead. In some embodiments, such methods may include analytically excluding identity terms. In some embodiments, such methods may include using unique parameters that may be either assigned or algorithmically learned in order to further optimize lighting output. In some embodiments, such methods may include calculating vectors (e.g., from the sensory detection of the velocity of a moving person, car, or other object, etc.) to be used to project lighting output in front of movement. In some embodiments, such methods may include conducting complex trail analysis in order to evoke trends and inform lighting patterns. In some embodiments, such methods may include using learning algorithms that may elicit optimal parameters over time. In some embodiments, such methods may include using a database to store information and enable the prediction of optimal parameters at new locations.

In an embodiment, a dynamic geospatial software interface may be provided that is configured to dynamically and geospatially animate (or illustrate animations related to) lighting output and/or sensory input.

In some embodiments, the lighting systems may be used as a form of communicating information, including but not limited to the indication of a location of a car within a parking garage, the indication of entrance and exit routes (including in case of an emergency such as the presence of fire, smoke, or hazardous gases), or the indication of an optimal route (such as for an ambulance). An embodiment method may include operations for altering light output to achieve communication, including fluctuations in lighting dependent on space and time in order to indicate directionality. In some embodiments, the method may include using other spatially resolved devices connected to the networked lighting infrastructure, including audio speakers.

In some embodiments, a processor of a computing device may be configured to perform operations for indicating a path using a dynamic, spatially resolved lighting system, wherein the operations may include detecting a presence or motion of an object, and altering an output of the lighting system to indicate a directional path for the object. In some embodiments, altering the output may include increasing brightness of light emitted by the lighting system along the path and either turning off or dimming brightness of light emitted by the lighting system that may be located outside the path. In some embodiments, altering the output may be based on an algorithm which utilizes stored or received data. In some embodiments, the object may include a person and wherein the path provides a path to location of a vehicle in a parking location. In some embodiments, the parking location may include a location in an outdoor parking lot or a location within a parking garage. In some embodiments, the path may include a path to an entrance or exit from a location. In some embodiments, the path may be illuminated by the light emitted by the lighting system in case of an emergency. In some embodiments, the emergency may include a presence of at least one of a fire, smoke, or hazardous gas.

In some embodiments, the path may include an optimal route path. In some embodiments, the object may include an emergency vehicle and the optimal route path may be provided for the emergency vehicle to a predetermined destination of the emergency vehicle in response to the detecting the presence or movement of the emergency vehicle. In some embodiments, the emergency vehicle may include an ambulance, a fire response vehicle or a police vehicle. In some embodiments, the directional path may include an optimal path of a plurality of possible paths that may be illuminated by the lighting system that the object can follow. In some embodiments, the directional path may not include merely increasing brightness of street lights to illuminate a road ahead of a moving vehicle using street lights and dimming or turning off street lights behind the vehicle as the vehicle passes the street lights.

Some non-limiting examples of lighting systems (or lighting sensory networks) associated with exemplary lighting infrastructures that are capable of being used with the embodiment techniques described herein are described in U.S. Pat. No. 8,732,031, filed on Jun. 12, 2013 and U.S. Patent Publication No. 2014/0084795, filed Sep. 11, 2013, which are incorporated herein by reference in their entirety for all purposes.

The embodiment techniques may improve lighting systems by allowing for easy and dynamic addition and/or subtraction of sensor nodes and/or lighting nodes within associated lighting infrastructures. As the compositing operations combine lighting model outputs that are not based on predefined lighting capabilities of the lighting infrastructure (e.g., lighting node numbers and/or availability) but instead ideal representations of lighting resulting from detected sensor data, different arrangements and/or numbers of lighting nodes within lighting infrastructures may be supported. For example, a parking garage operator may arbitrarily add new lighting nodes and still utilize the same lighting control algorithms for presence detection, as the new lighting nodes may simply be sampled for their own individual lighting settings during embodiment compositing operations. By enabling dynamic, disparate lighting control algorithms to be supported in a harmonious manner, the embodiment techniques enable the improvement of lighting conditions in a manner that makes the best use of sensory inputs despite their limitations, and in a manner that enables rapid scale by minimizing time-intensive manual intervention.

Additionally, embodiment techniques may improve the functioning of devices within a lighting infrastructure by enabling dynamic configurations based on periodic evaluations using up-to-date sensor data. Because composited light model may be calculated regularly (e.g., every few seconds, etc.) based on executions of various lighting control algorithms that use "fresh" sensor data, the power efficiency of lighting nodes may be improved as lighting node configurations may be continually set to accommodate temporally and spatially relevant conditions of the lighting infrastructure. Further, as irrelevant or null data or lighting control algorithms may be avoided during compositing operations, lighting nodes may be set to output lighting only when necessary, thus saving processing and power resources for message management and lighting element usage.

The embodiment techniques are different from conventional lighting techniques in that in the embodiment techniques disparate lighting control algorithms may be evaluated and cumulatively applied to identify lighting settings for an arbitrary number and arrangement of lighting nodes. Unlike some conventional techniques, the embodiment techniques do not require any fixed paths or arrangements of lighting nodes. Instead, embodiment techniques assign lighting commands based on lighting node availability (e.g., existence, location) relative to composited lighting models. In other words, the embodiment techniques may utilize a composited lighting image that uses whatever available lights to make lighting/light coloring within the lighting infrastructure without any pre-programmed lighting node logic, routines, etc. Thus, the lighting systems of the embodiment techniques are self-organizing, unplanned, and dense deployments.

Further, unlike some conventional techniques, the embodiment techniques may not combine a plurality of sensor datasets for use with a single application to identify actions to perform. Instead, the embodiment techniques may composite an arbitrary number of lighting model outputs to determine all-encompassing lighting commands for lighting nodes, wherein each lighting model output is the result of processing sensor data. The embodiment techniques may not require dependencies between sensor data and lighting node configurations, between individual lighting control algorithms, nor between the lighting control algorithms and the lighting nodes that may be impacted by the algorithms. In other words, the embodiment techniques may utilize an abstraction layer between sensor inputs, lighting control algorithms, and the eventual lighting node configurations.

It should be appreciated that in using a plurality of nodes of a lighting infrastructure as well as various lighting control algorithms, embodiment techniques may provide lighting node configurations that are dynamic and require more complex logic than merely increasing the brightness of predefined lights in predefined manners (e.g., increase light from street lights to illuminate an area of road ahead of a moving vehicle, dimming or turning off the lights behind a vehicle as the vehicle passes street lights, etc.). The embodiment techniques may require first generating lighting model output(s) that do not directly consider available lighting sources, and then sampling the output(s) to identify individual lighting node configurations for arbitrarily placed and available lighting nodes.

Figure 1:
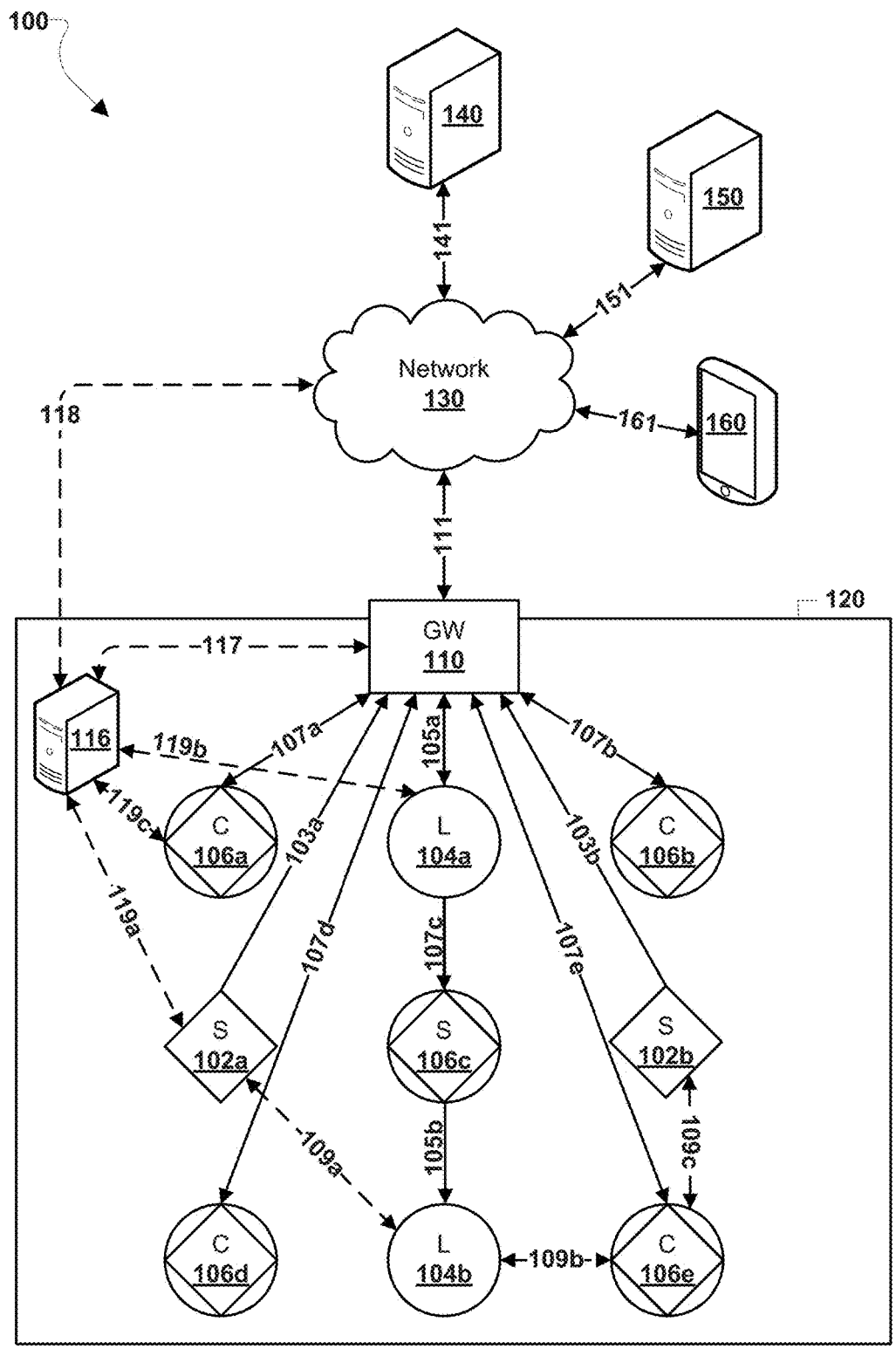
FIG. 1 is a component block diagram of a communication system associated with a lighting infrastructure that includes at least lighting nodes and sensor nodes and is suitable for use with various embodiments.

FIG. 1 illustrates a communication system 100 associated with a lighting infrastructure 120 that includes lighting nodes 104a-104b, sensor nodes 102a-102b, and combination lighting nodes 106a-106e suitable for use with various embodiments. The lighting infrastructure 120 may be any building, place, area, campus, and/or location that is equipped with devices for a lighting sensor network, such as at least lighting nodes, sensor nodes, and/or combination lighting nodes. For example, the lighting infrastructure 120 may be a parking deck or an underground parking garage outfitted with lights to enable drivers to see where to drive, etc. The nodes 102a-102b, 104a-104b, 106a-106e may be placed throughout the lighting infrastructure 120, such as attached to floors, ceilings, walls, columns, etc. In this way, conditions of at least a portion of the lighting infrastructure 120 may observed via the nodes having sensor functionalities (i.e., sensor nodes 102a-102b and combination lighting nodes 106a-106e) and lighting may be influenced via the nodes having lighting functionalities (i.e., lighting nodes 104a-104b and combination lighting nodes 106a-106e). For example, based on their positioning throughout the lighting infrastructure 120, the sensor nodes 102a-102b may be configured to gather sensor data (e.g., sound, motion, visuals, etc.) indicating the movement and activities of humans and vehicles, and/or other conditions within the lighting infrastructure (e.g., gas, smoke, etc.). As another example, the lighting nodes 104a-104b may be positioned throughout the lighting infrastructure 120 (e.g., a parking deck) such that a large portion of the floor may be lit with LEDs.

In various embodiments, there may be any combination and/or number of nodes 102a-102b, 104a-104b, 106a-106e within a lighting infrastructure 120. For example, there may be an equal number of sensor nodes and lighting nodes or alternatively, there may be a plurality of lighting nodes for each sensor node within a parking garage. In other words, sensor nodes 102a-102b and lighting nodes 104a-104b may or may not be located coincident to each other. Further, the number and or location of nodes 102a-102b, 104a-104b, 106a-106e within a lighting infrastructure may be variable, as lighting infrastructure owners may add or remove these nodes over time. In various embodiments, whenever nodes are added, removed, or otherwise repositioned within the lighting infrastructure 120, data may be stored and/or updated in a computing device (e.g., a remote server 140, etc.) to identify the current location or coordinates of each node within the lighting infrastructure 120.

The nodes 102a-102b, 104a-104b, 106a-106e may be configured with networking capabilities, such as wired or wireless connections (e.g., Wi-Fi®, etc.) to each other and/or other computing devices within the lighting infrastructure 120. For example, the nodes 102a-102b, 104a-104b, 106a-106e may utilize wired or wireless connections 103a-103b, 105a-105b, 107a-107e to a gateway device 110 (or gateway computing device) that is configured to process, store, and/or otherwise utilize data received from nodes 102a-102b, 106a-106e as well as process, stored, and/or transmit data to nodes 104a-104b, 106a-106e. In some embodiments, the gateway device 110 may or may not include functionalities of a sensor node and/or a lighting node. In some embodiments, the various nodes 102a-102b, 104a-104b, 106a-106e may be configured to exchange messaging via wired or wireless connections. For example, a first sensor node 102a may be configured to exchange data with a second lighting node 104b via a wired or wireless connection 109a and the second lighting node may be configured to exchange data via a wireless or wired connection 109b with a fifth combination lighting node 106e.

In some embodiments, the gateway device 110 may serve as an access point for enabling communications between the nodes 102a-102b, 104a-104b, 106a-106e and a wide area network (WAN) 130. For example, the gateway device 110 may utilize a wired or wireless connection 111 to the WAN 130 to exchange communications with various remote devices. In particular, the gateway device 110 may transmit various data (e.g., sensor data, lighting control algorithm models, etc.) to a remote server 140 that is connected to the WAN 130 via a wired or wireless connection 141. Through this connectivity, the gateway device 110 may also receive various data from the remote server 140, such as lighting commands to be relayed to the various lighting nodes 104a-10b and 106a-106e.

In some embodiments, the communication system 100 may or may not utilize remotely-based processors to compute data, such as lighting levels for individual lights based on location-specific sensor inputs. For example, the remote server 140 may be configured to perform compositing operations on lighting model outputs from various lighting control algorithms executed by various computing devices (e.g., the remote server 140, the gateway device 110, etc.). In some embodiments, the remote server 140 may be configured to communicate with other devices via the WAN 130, such as other servers 150 connected to the WAN 130 via wired or wireless connections 151, and/or mobile devices 160 connected to the WAN 130 via wired or wireless connections 161. For example, the remote server 140 may request or download data from the other servers 150 that indicate conditions at the lighting infrastructure 120 (e.g., weather, visibility, lighting forecasts, etc.) and/or may receive user requests to adjust lighting conditions from the mobile devices 160. Data received from the other servers 150 and/or the mobile devices 160 may or may not be utilized by the remote server 140 when generating lighting commands for lighting nodes 104a-104b, 106a-106e within the lighting infrastructure 120. For example, the remote server 140 may utilize user requests received from the mobile devices 160 to calculate a requested lighting model that may be combined with other lighting models as defined by lighting control algorithm output data received from the gateway device 110 in order to determine a composite lighting model as described herein. In some embodiments, the mobile devices 160 may be configured to utilize a software interface as described below with reference to FIG. 13.

In some embodiments, the communication system 100 may include embedded, local processors at the lighting infrastructure 120 to compute information, such as lighting levels for individual lights based on location-specific sensor inputs. For example, the lighting infrastructure 120 may also include a local computing device 116 configured to perform various operations associated with the lighting infrastructure 120, such as computing sampled values (or lighting settings) and transmitting lighting commands to lighting nodes 104a-104b, 106a-106e based on sensor data from the sensor nodes 102a-12b, 106a-106e. The local computing device 116 may be connected with a wired or wireless connection 117 to the gateway device 110. In some embodiments, the local computing device 116 may be included within or otherwise the same as the gateway device 110. In some embodiments, the local computing device 116 may be in direct communication with some or all of the nodes of the 102a-102b, 104a-104b, 106a-106e of the lighting system. For example, the local computing device 116 may exchange data with a first sensor node 102a, a first lighting node 104a, and/or a first combination lighting node 106a via the respective connections 119a-119c.

In some embodiments, any combination of the devices 102a-102b, 104a-102b, 106a-106e, 110, 116, and 140 may be configured to perform any or all of the operations of the embodiment techniques described herein. For example, sensor data may be transmitted for evaluation and incorporation in composited lighting models at the remote server 140, the gateway device 110, the local computing device 116, and/or one or more of the individual nodes 102a-102b, 104a-104b, 106a-106e. As another example, the gateway device 110 and/or the local computing device 116 may be configured to generate a plurality of lighting model outputs by executing lighting control algorithms using sensor data from various sensor nodes 102a-102b, 106a-106e. The gateway device 110 and/or the local computing device 116 may also transmit the lighting model outputs to the remote server 140 for compositing into a composited lighting model and generating lighting commands for any or all of the individual lighting nodes 104a-104b, 106a-106e. As another example, each sensor node 102a-102b, 106a-106e may be configured to perform lighting control algorithms to generate lighting model outputs based on its respective sensor data which in turn may be transmitted to another device (e.g., the gateway device 110, the local computing device 116, the remote serve 140) for compositing operations and generating lighting commands for the lighting nodes 104a-104b, 106a-106e. In other words, any of the devices of the communication system 100 may or may not include components and configurations for enabling the embodiment techniques on an individual basis or in combination with other devices.

The following is an illustration of one exemplary data flow over the communication system 100. Nodes 102a-102b, 106a-106e may obtain sensor data (e.g., gas readings, occupancy data, etc.) and transmit the obtained sensor data to the gateway device 110 for relaying to the remote server 140. In response to receiving the sensor data, the remote server 140 may execute one or more lighting control algorithms to generate lighting model output(s) based on the relayed sensor data. For example, the remote server 140 may execute a first lighting control algorithm that identifies a time-varying lighting model for the lighting infrastructure 120 that predicts how pedestrians may be moving over a small period of time, a second lighting control algorithm that identifies how lighting should be affected to compensate for an ambient light level (e.g., sunlight), and a third lighting control algorithm that causes lights to go up in luminosity based on a detected sound (e.g., car window shattering, etc.). The remote server 140 may perform operations to generate a composite light model based on the generated lighting model outputs. Using stored coordinates for the lighting nodes 104a-104b, 106a-106e and an applicable time value, the remote server 140 may sample the composited light model for each lighting node 104a-104b, 106a-106e within the lighting infrastructure 120 to identify lighting commands to send to instructs the individual nodes 104a-104b, 106a-106e how to configure their light elements (e.g., LED dimming, etc.). Such lighting commands may or may not go back to devices that transmitted the sensor data.

Figure 2A:
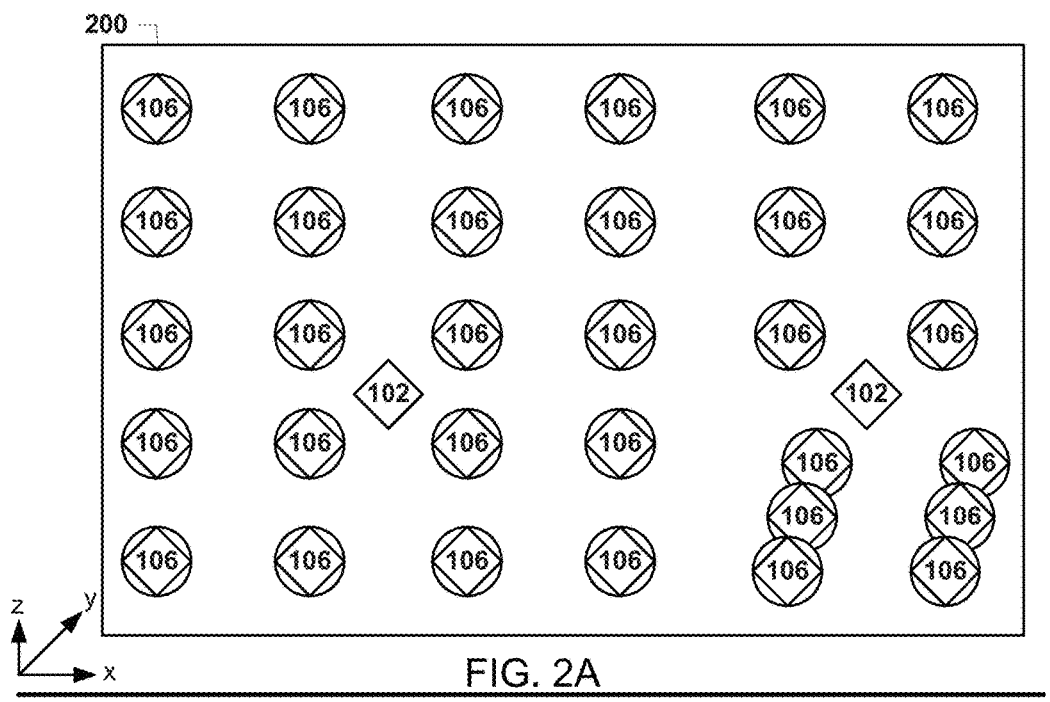
FIGS. 2A-2B are top view diagrams of exemplary installations (or lighting infrastructures) that include lighting nodes and sensor nodes and are suitable for use with various embodiments.
Figure 2B:
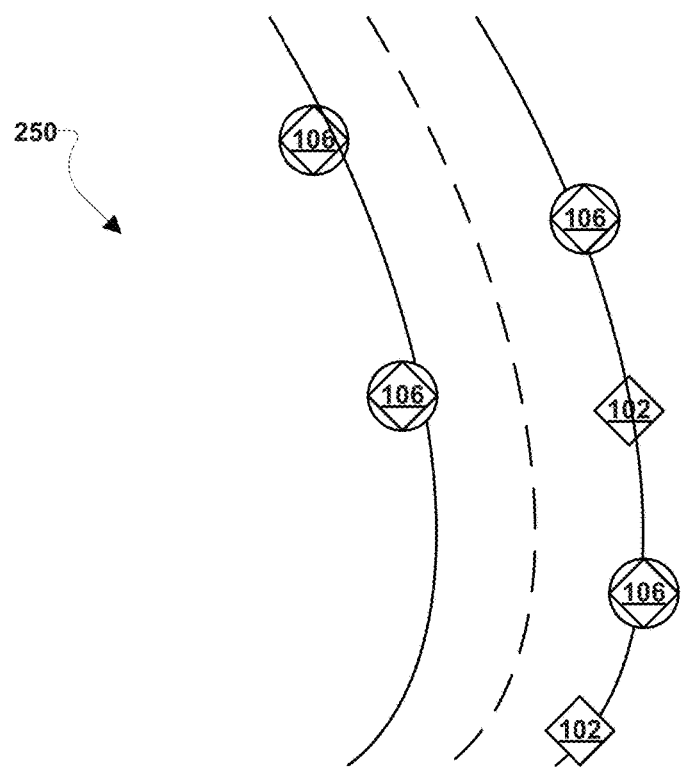

FIGS. 2A-2B illustrate exemplary installations (or lighting infrastructures) that include lighting nodes and sensor nodes and are suitable for use with various embodiments. In particular, FIG. 2A illustrates a spatially-resolved networked lighting infrastructure 200 with sensor nodes 102. For example, the lighting infrastructure 200 may be a parking deck in which a plurality of combination lighting nodes 106 are distributed throughout in addition to a plurality of dedicated sensor nodes 102. FIG. 2B illustrates another spatially-resolved networked lighting infrastructure 250 with sensor nodes 102, such as a roadway that includes both combination lighting nodes 106 and dedicated sensor nodes 102.

As described above, one or more lighting control algorithms may be simultaneously executed by one or more computing devices in order to identify potential lighting in a lighting infrastructure with relation to various lighting objectives. Each of the lighting control algorithms used for the lighting infrastructure may utilize different sensor inputs (e.g., presence, motion, etc.) to generate different individual lighting model outputs that may be combined together and sampled to determine ultimate lighting commands for lighting nodes at a given time. The composited lighting model may cause lighting nodes to be configured in different manners than they may be if only using a single lighting control algorithm to generate lighting commands. FIGS. 3A-3E illustrate an exemplary compositing of lighting control algorithm outputs related to an exemplary spatially-resolved lighting infrastructure 300 having a plurality of lighting nodes 302. The plurality of lighting nodes 302 may include any combination of lighting nodes and/or combination lighting nodes. Further, although not shown in the lighting infrastructure 300, it should be appreciated that at least one sensor node may be included in the lighting infrastructure 300, such as combination lighting nodes or dedicated sensor nodes that may or may not be co-located with any of in the plurality of lighting nodes 302.

Figure 3A:
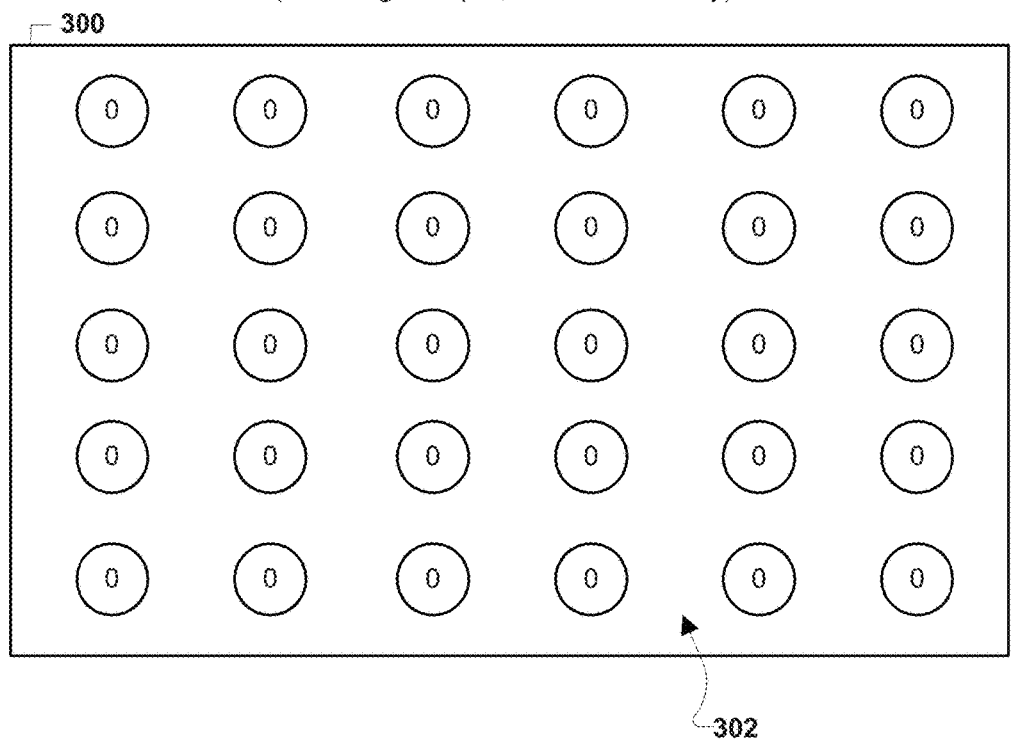
FIG. 3A is a top view diagram of an exemplary lighting infrastructure having a plurality of lighting nodes set at a default (e.g., "off") configuration suitable for use in various embodiments.

FIG. 3A shows the plurality of lighting nodes 302, with each lighting node configured to use a default luminosity level of '0' at a first time. In other words, each in the plurality of lighting nodes 302 may be set to an 'off' configuration or status with no light being produced. It should be appreciated that any default value may be used and that the '0' default value is merely used for simplicity. For example, a default value may be half luminosity (e.g., 50%) for a certain time of day, etc.

Figure 3B:
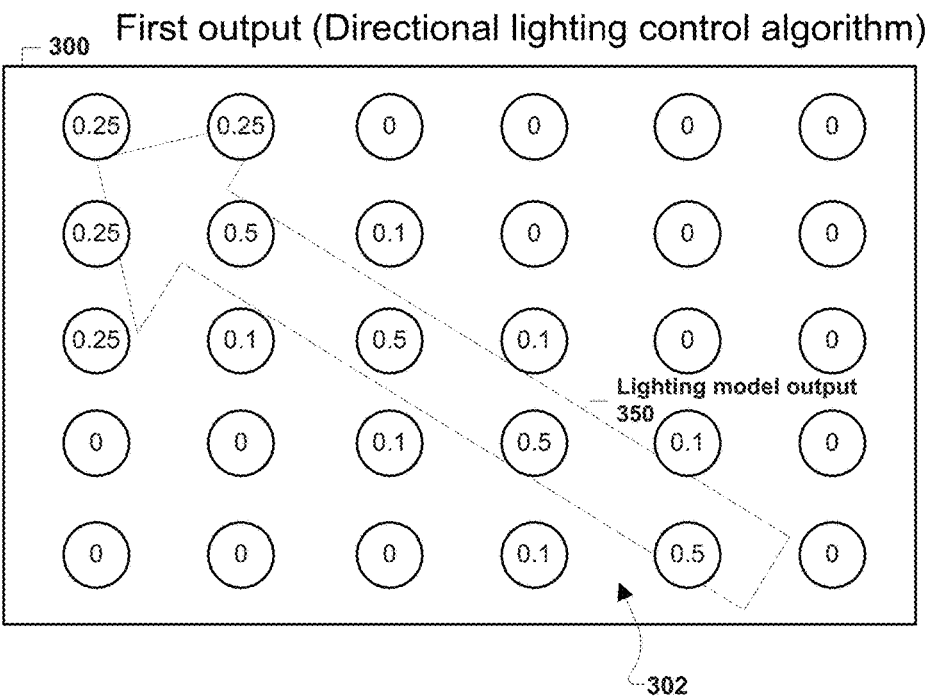
FIG. 3B is a top view diagram of an exemplary lighting infrastructure having a plurality of lighting nodes set with various luminosity configurations based on a first lighting control algorithm output according to some embodiments.

FIG. 3B illustrates luminosity configurations of the plurality of lighting nodes 302 based solely on a first lighting control algorithm (e.g., a "directional lighting control algorithm"). The output from the first lighting control algorithm may be additively combined (or composited together) by a computing device (e.g., remote server 140, etc.) with other output data from other lighting control algorithms for the lighting infrastructure.

The first lighting control algorithm may be a use case or application, such as an algorithm for dynamically determining how to inform pedestrians or vehicles of important information during detected conditions (e.g., an emergency, fire, etc.) in the lighting infrastructure 300. In particular, the first lighting control algorithm may be used to provide light directionality that communicates information, such as the location of an entrance or exit within the lighting infrastructure 300. For example, such a first lighting control algorithm may infer where people may be walking in a particular direction based on sensor data, and may generate a lighting model output 350 indicating how lighting may be configured to show a direction over a period of time. As shown in FIG. 3B, if applied to individual lights in the plurality of lighting nodes 302, lighting model output 350 may cause the lighting nodes to be configured to emit different levels of light in order to show a directed light. Accordingly, not all the lights of the plurality of lighting nodes 302 may be affected by the output of the first lighting control algorithm.

Figure 3C:
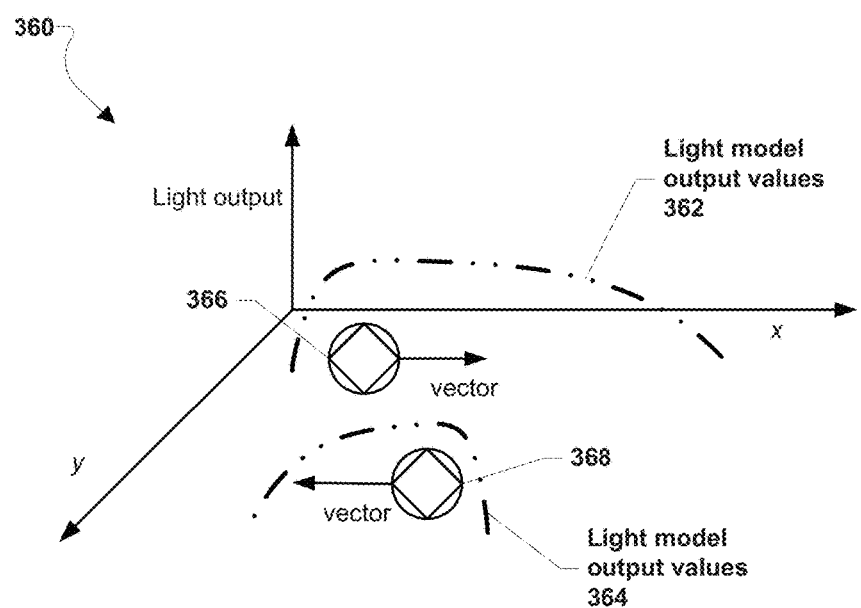
FIG. 3C is a perspective view diagram of exemplary vectors applicable to lighting nodes and corresponding to various light outputs suitable for use in various embodiments.

FIG. 3C shows a diagram 360 illustrating exemplary vectors applicable to lighting nodes 366, 368 and corresponding to various light outputs, such as generated via the first lighting control algorithm. In other words, the diagram 360 shows how sensory inputs may be used to compute vectors (e.g., indicating movement/direction) and project lighting in front of movement within a lighting infrastructure. For example, the first lighting model output values 362 may indicate that lighting may be more intense (e.g., a high light output value) the closer a first lighting node 366 is to a '0' x coordinate. As another example, the second lighting model output values 364 may indicate that lighting may be less intense (e.g., a low light output value) the closer a second lighting node 368 is to a '0' x coordinate.

Such vectors (e.g., from the sensory detection of the velocity of a moving person, car, or other object) may be calculated and used to project lighting output in front of movement. In some embodiments, complex trail analysis may also be conducted in order to evoke trends and inform lighting patterns.

In some embodiments, such directional lighting control algorithms, such as illustrated in FIGS. 3B-3C, may be used to indicate a location of a car within a parking garage, entrance and/or exit routes (e.g., routes used in case of an emergencies, such as the presence of fire, smoke, or hazardous gases, etc.), and/or an optimal route within the lighting infrastructure (e.g., a route for an ambulance). Further, such algorithms may be used to control lighting (or alter lighting) to achieve communication, such as by causing fluctuations in lighting dependent on space and time in order to indicate directionality. In some embodiments, one or more processing units of computing devices (e.g., remote server 140, local computing device 116, etc.) may be configured to execute such lighting control algorithms to creates lighting controls for indicating a path (e.g., a path to an entrance or exit from a location, an optimal route path, etc.). Such an algorithm may include operations including detecting a presence or motion of an object and altering an output of the plurality of lighting nodes to indicate a directional path for the object. Other operations may include increasing the brightness of light emitted by the lighting nodes along the path and either turning off or dimming brightness of the light emitted by the lighting nodes that are located outside the path. Such an object may include a person, and the path may provide a path to location of a vehicle in a parking location (e.g., a location in an outdoor parking lot or a location within a parking garage). In some embodiments, the path may be illuminated by the light emitted by the lighting nodes in case of an emergency (e.g., a presence of at least one of a fire, smoke, or hazardous gas, etc.) as determined based on obtained sensor data from sensor nodes. In some embodiments, when the path may be an optimal route path, the object may be an emergency vehicle (e.g., an ambulance, a fire response vehicle, a police vehicle, etc.) and the optimal route path may be provided for the emergency vehicle to travel to a predetermined destination in response to the detecting the presence or movement of the emergency vehicle. In some embodiments, the path may be an optimal path of a plurality of possible paths that may be illuminated to enable the object to follow.

Returning to FIGS. 3A-3F, FIG. 3D illustrates exemplary luminosity configurations of the plurality of lighting nodes 302 based solely on a second lighting control algorithm (e.g., an "event lighting control algorithm"). The lighting model output 370 from the second lighting control algorithm may be additively combined (or composited together) by a computing device (e.g., remote server 140, local computing device 116, etc.) with other output data from other lighting control algorithms for the lighting infrastructure, such as composited together with the lighting model output 350 from the first lighting control algorithm.

Figure 3D:
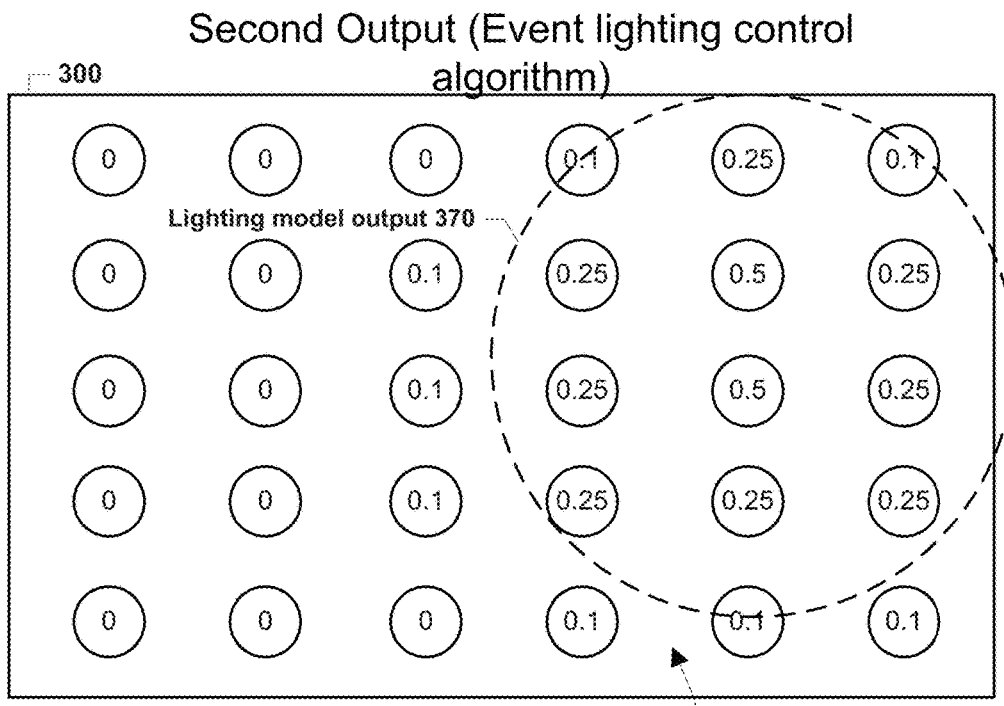
FIG. 3D is a top view diagram of an exemplary lighting infrastructure having a plurality of lighting nodes set with various luminosity configurations based on a second lighting control algorithm output according to some embodiments.

The second lighting control algorithm may be related to another use case or application, such as an algorithm for dynamically determining lighting based on encountered events as indicated by gathered sensor data. For example, the event may be a detected car alarm based on audio data obtained from audio sensors (e.g., microphones). The second lighting control algorithm may be used to provide light around the locus of such an event (e.g., an area light effect to help deter break-ins, etc.). As shown in FIG. 3D, as applied to individual lights in the plurality of lighting nodes 302, the lighting model output 370 may cause the lighting nodes to be configured to emit different levels of light in order to show a circle of light in the lighting infrastructure 300. Accordingly, not all the lights of the plurality of lighting nodes 302 may be affected by the output of the second lighting control algorithm.

Figure 3E:
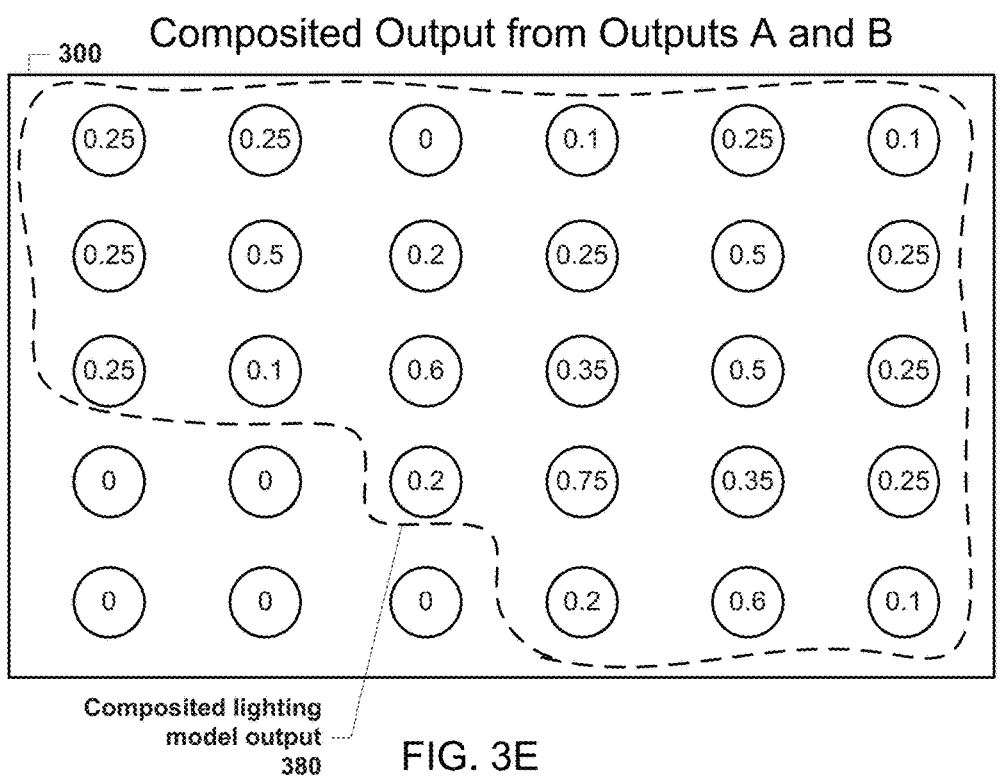
FIG. 3E is a top view diagram of an exemplary lighting infrastructure having a plurality of lighting nodes set with various luminosity configurations based on a composited lighting model based on the outputs from the first and second lighting control algorithms of FIGS. 3B and 3D and according to some embodiments.

FIG. 3E illustrates luminosity configurations of the plurality of lighting nodes 302 based on a compositing of the first and second outputs (e.g., lighting model outputs 350, 370) from the first and second lighting control algorithms. In other words, the composited lighting model 380 may be generated by additively combining the individual lighting model outputs 350, 370 shown in FIGS. 3B and 3D respectively. Based on the composited lighting model 380, configurations for each in the plurality of lighting nodes 302 may be generated, allowing the lighting effects of both the first lighting control algorithm and the second lighting control algorithm to be represented by the lighting configurations of the lighting nodes of the lighting infrastructure 300 at the same time.

Figure 3F:
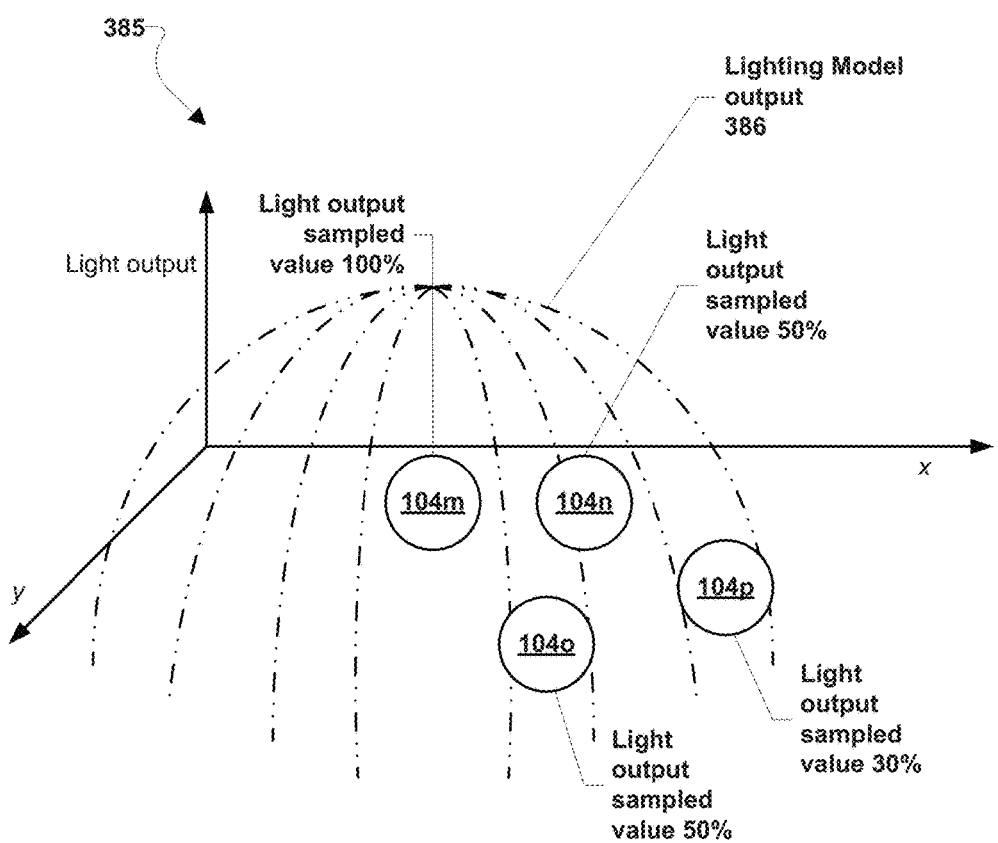
FIG. 3F is a perspective view diagram of a light output (or lighting model) that may be used to determine various luminosity configurations for lighting nodes in a lighting infrastructure according to some embodiments.

FIG. 3F illustrates a diagram 385 showing visualization of a lighting model output and potential lighting outputs (i.e., sampled values) to lighting nodes based on compilation of lighting control algorithm outputs (e.g., lighting model outputs as a function of space and time). In other words, the diagram 385 shows a continuous modeled light output that may be sampled at discrete points to approximate the optimal modeled light output for individual lighting nodes. As it is based on at least sensor data without considering lighting nodes that may produce light, such lighting model output data may include much more information than may be used in actual implementation with a particular plurality of lighting nodes 302. The diagram 385 may show all hypothetical values for any lighting nodes that may be within the lighting infrastructure. In some embodiments, such a lighting model output may be from either a single lighting control algorithm or resulting from compositing procedures as described herein (e.g., a composited lighting model).

The diagram 385 generally indicates how a computing device performing embodiment compositing operations may determine individual lighting configurations (e.g., luminosity, etc.) for lighting nodes 104m-104p in a lighting infrastructure. In particular, such a computing device (e.g., local computing device 116, remote server 140, etc.) may compare geospatial data (e.g., coordinates of a lighting node within a lighting infrastructure) to the composited lighting model 386 in order to obtain a sampled luminosity value for each lighting node 104m-104p. For example, based on such a comparison, the computing device may determine that a first lighting node 104m may have a 100% sampled value (e.g., the lighting node 104m should be turned 'on' to its full luminosity), a second lighting node 104n and a third lighting node 104*o* may both have a 50% sampled value (e.g., half luminosity), and a fourth lighting node 104*p* may have a 30% sampled value. In various embodiments, in addition to using the composited lighting model 386, the computing device may determine sampled values for lighting nodes based on the lighting nodes' locations within the lighting infrastructure, their individual characteristics (e.g., model, lighting capabilities, power, etc.), and a time.

As described above, lighting model outputs (and/or composited lighting models) may be considered to correspond to geospatial variables such that sampled values for a lighting node may be related to its location within a lighting infrastructure. However, as lighting model outputs (composited or otherwise) may include output data for a period of time, output values relevant to a particularly-located lighting node may also vary over time. In other words, lighting configurations as determined by lighting model outputs (or composited lighting model) may vary (or be animated) over space and time. For example, as lighting model outputs may be simulation data that indicate lighting output information over a period of time, the computing device may determine different sampled values for a particular lighting node at different times.

Figure 4A:
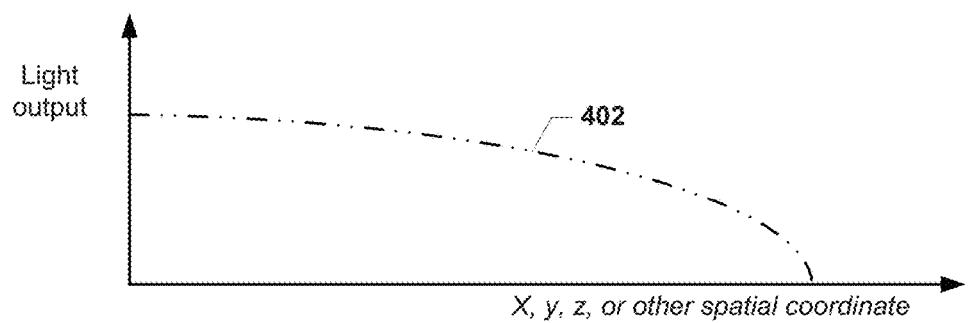
FIG. 4A is a diagram illustrating light output from a lighting control algorithm according to some embodiments, wherein the light output is shown relative to spatial coordinates.
Figure 4B:
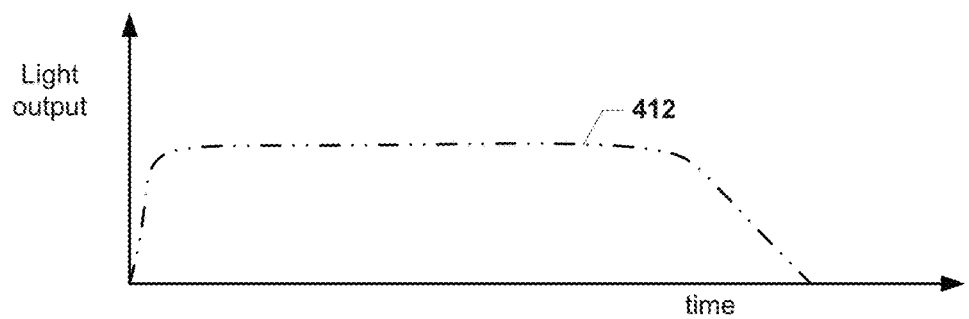
FIG. 4B is a diagram illustrating light output from a lighting control algorithm according to some embodiments, wherein the light output is shown relative to time.

FIGS. 4A-4B show possible light output associated with a lighting control algorithm. However, it should be appreciated the output values of FIGS. 4A-4B may also be similar to potential outputs from executing embodiment compositing operations that may be a combination of one or more lighting model outputs from one or more lighting control algorithms.

In some embodiments, lighting control algorithms may be represented as or otherwise utilize mathematical representations or "lighting functions" for mapping lighting configurations (e.g., luminosity outputs) for arbitrary lighting nodes within lighting infrastructures. FIGS. 4A-4B illustrate an exemplary spatial and temporal lighting function that may define light levels related to sensory inputs. An example lighting function may be notated as follows:

$$f(x:\mathbb{R},y:\mathbb{R},z:\mathbb{R},t:\mathbb{R}) \mapsto C$$

wherein x, y, and z may be spatial parameters, t may be a temporal parameter (i.e., time), and C may be a light field (i.e., a lighting model output). In other words, lighting functions associated with lighting control algorithms and/or compositing procedures may map spatial parameters (e.g., x, y, and z, and temporal parameter time or 't'), to light fields (C). The x and y parameters may specify latitude and longitude coordinates in a predetermined coordinate space (e.g., World Geodetic System (WGS84), etc.). Elements of the light field (C) may simply be scalar dimming values. For example, a '0' value may represent a minimum light output intensity of a lighting node (e.g., a lighting node light set to 'off'), and '1' value may represent a maximum light output intensity of the lighting node (e.g., the light set to full luminosity), and values between 0 and 1 may represent interpolated light output intensities. In some embodiments, the light field C may be in vector space with light color components, in addition to a luminosity component. In some embodiments, such lighting functions may not be pure functions defined solely in terms of input location and time, and thus may include other considerations or parameters.

Returning to FIGS. 4A-4B, FIG. 4A illustrates possible output values 402 determined in response to a computing device performing a lighting control algorithm. In various embodiments, a computing device (e.g., a remote server 140, etc.) may compare geospatial coordinates of a lighting node within a lighting infrastructure (e.g., x, y, z, etc.) to the possible output values 402 to determine a configuration for the lighting node. In the exemplary case of FIG. 4A, as the spatial coordinate(s) of a lighting node get farther from an origin value (e.g., '0') associated with the lighting control algorithm, the lighting node may be commanded to have a dimmer light configuration. FIG. 4B illustrates exemplary output values 412 associated with a lighting control algorithm similar to as described above with reference to FIG. 4A, except that the output values 412 may be with respect to time values. For example, as time goes on, the lighting model output values for the exemplary lighting control algorithm may change (e.g., increase, stabilize, and then drop.).

Figure 4C:
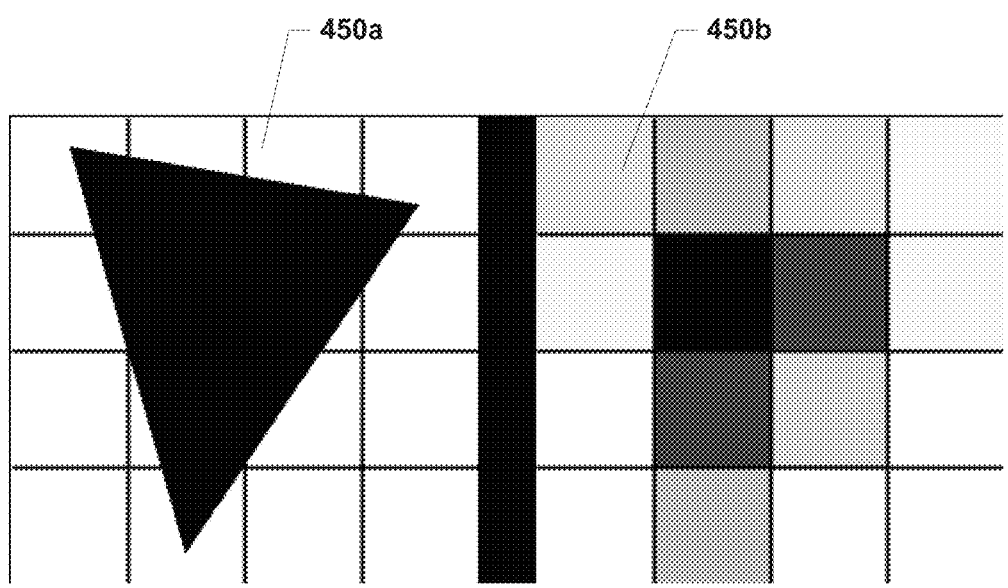
FIGS. 4C-4D are diagrams illustrating blending techniques suitable for use in some embodiments.
Figure 4D:
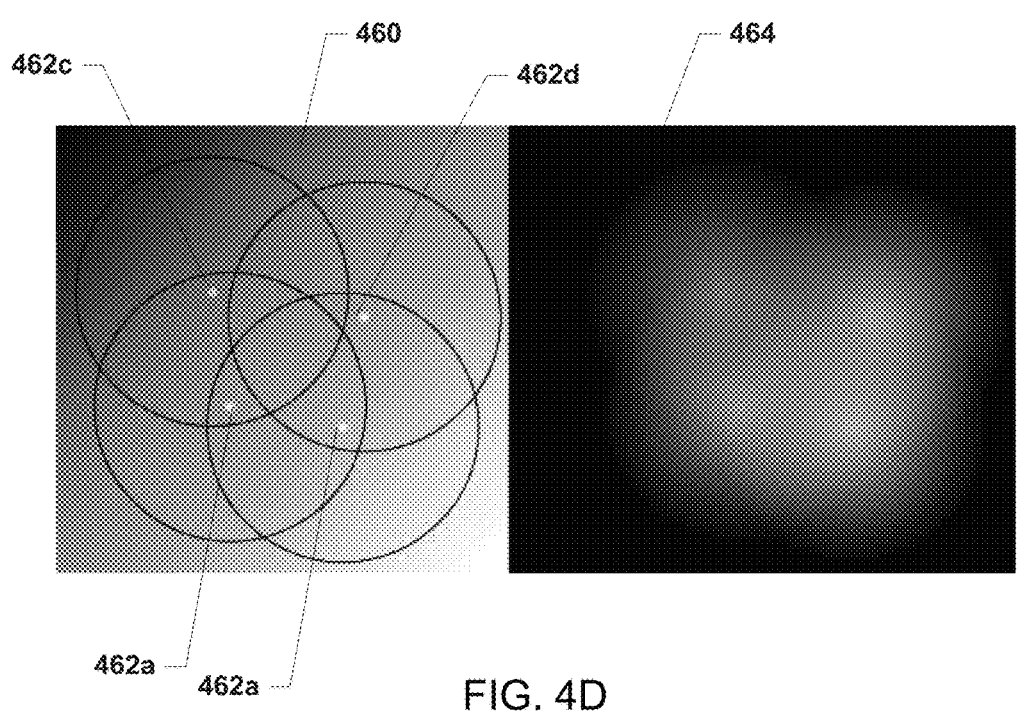

FIGS. 4C-4D are related to exemplary blending techniques that may be used in some embodiment compositing operations as described herein. In some embodiments, composited light models may be generated by a computing device (e.g., a remote server 140) that is configured to utilize light blending techniques. For example, in some embodiments, computing devices configured to generate composited lighting models may utilize compositing algebra that provides operators for blending partially obscured pixels in raster images. Such compositing techniques may model the degree to which a pixel is matted by extending standard additive light color spaces with a component (e.g., an "alpha channel"). For example, in some embodiments, a computing device (e.g., remote server 140) may be configured to evaluate lighting nodes positioned in a continuous space by interpreting compositing techniques, such as the exemplary "Porter/Duff" compositing algebra and operations as described in the article "Compositing Digital Images", published in *ACM SIGGRAPH Computer Graphics*, Volume 18, Number 3 (July 1984).

The following is an illustration of such compositing techniques that may be performed by a computing device associated with a lighting infrastructure. Light functions of various lighting control algorithms may be used to model the desired ambient lighting conditions at every point in the infrastructure. The computing device may utilize conventional compositing techniques (e.g., Porter/Duff techniques) to interpret data such that the alpha channel that may represent the degree to which the light output of a lighting node fills the volume of space around itself. For example, an alpha value of '0' may signify a fully obscured, or opaque, pixel, and an alpha value of '1' may represent a completely un-obscured, or transparent, pixel. The alpha value of each point in a light field may be thought of as the average light flux through the space around that point. Similar to how some conventional compositing or blending techniques (e.g., Porter/Duff techniques) use an alpha channel to approximate arbitrarily shaped matte covering a raster sample, the computing device may interpret the alpha channel as a continuous convolution of the desired light flux around a point in real space. The computing device may apply light field parameters sampled from a continuous light function to a real-world lighting node to cause the illumination of the space in the lighting infrastructure around the lighting node to approximately resemble the expected output represented by the composited light model (i.e., the combination of the individual light functions of the various lighting control algorithms).

FIG. 4C shows a diagram of images 450*a*, 450*b* that illustrate an exemplary light blending technique that may be used in various embodiments. In particular, the first image 450*a* shows a vector version of light output data (e.g., a theoretical shape to be illuminated) from a lighting control algorithm (or compositing operations) over a hypothetical lighting infrastructure space, and the second image 450b shows the light output data over the hypothetical lighting infrastructure space after being processed via a blending procedure (e.g., a Porter/Duff raster model procedure).

FIG. 4D shows a diagram of a first image 460 illustrating a linear 2D luminosity field with sample points 462a-462d coinciding with lighting nodes of a lighting infrastructure and circles denoting the extent of an alpha convolution per the above described techniques. FIG. 4D also shows a second image 464 that illustrates an approximate illumination pattern produced on a surface that is beneath lighting nodes (e.g., a parking deck floor) when applying the parameters of the sample points 462a-462d to actual lighting nodes at the equivalent real locations.

Figure 5A:
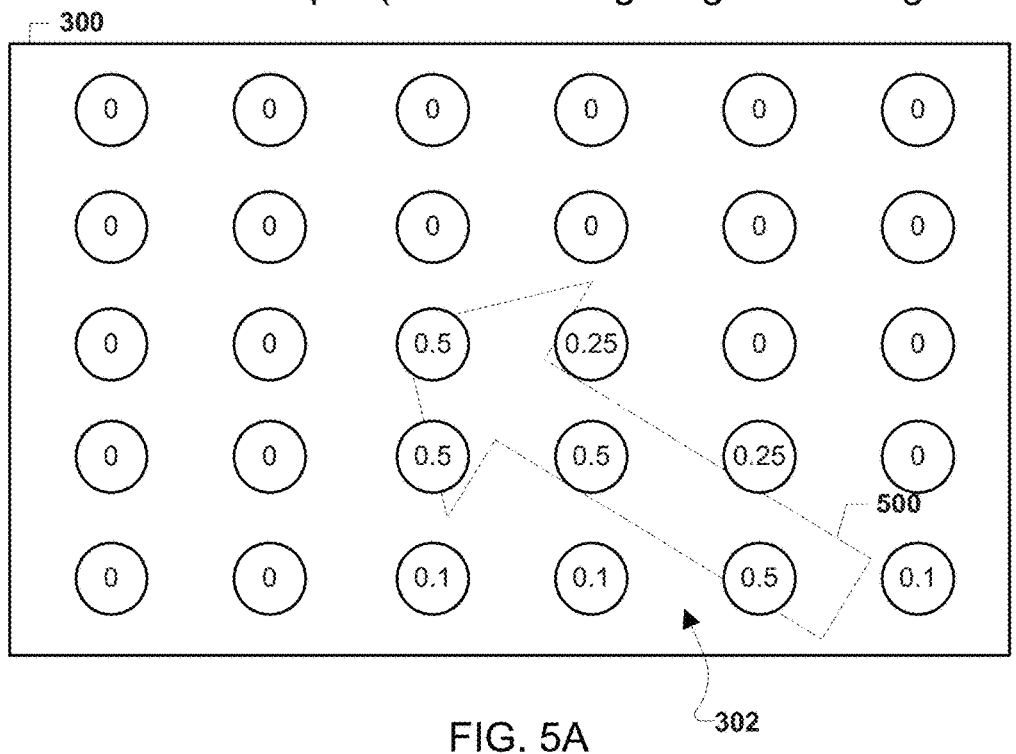
FIGS. 5A-5B are top view diagrams of an exemplary lighting infrastructure having a plurality of lighting nodes set with various luminosity configurations based on output at a first and second time from a time-varying lighting control algorithm according to some embodiments.
Figure 5B:
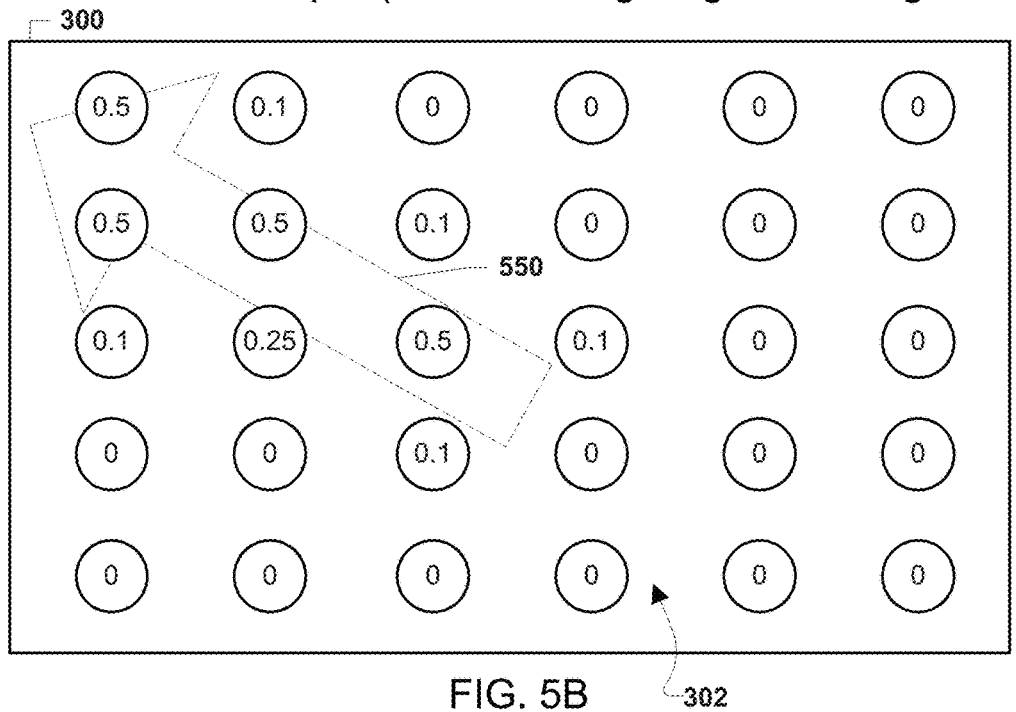

As described above, composited lighting models may include data for configuring lighting nodes over a period of time. In other words, composited lighting model outputs may be animated such that lighting nodes may change their settings to accomplish a lighting goal (e.g., communicating information, such as by illuminating a path, etc.). FIGS. 5A-5B illustrate diagrams of an exemplary lighting infrastructure 300 having a plurality of lighting nodes 302 with various lighting configurations (e.g., luminosity configurations) based on time-varying lighting control algorithm outputs at a first and second time. In other words, FIGS. 5A-5B show an exemplary animation within lighting model output data that may be used by a computing device (e.g., a remote server 140, etc.) when generating lighting control commands based on the compositing of one or more lighting model outputs. FIG. 5A illustrates a first lighting model output 500 from a directional lighting control algorithm, such as described above with reference to FIGS. 3B-3C. The first lighting model output 500 may correspond to a first time (or time period) for which output data was generated using the directional lighting control algorithm. For example, the computing device may have generated a path for guiding a person through the lighting infrastructure 300, and the first lighting model output 500 may indicate how the various lighting nodes of the plurality of lighting nodes 302 should be lit up to indicate the first section of the path. FIG. 5B illustrates a second lighting model output 550 from the directional lighting control algorithm at a second time (or second time period). For example, the second lighting model output 550 may indicate how the various lighting nodes of the plurality of lighting nodes 302 should be lit up to indicate a second section of the path. In various embodiments, the first and second lighting model outputs 500, 550 may be incorporated into a common, time-varying dataset or model.

Figure 6:
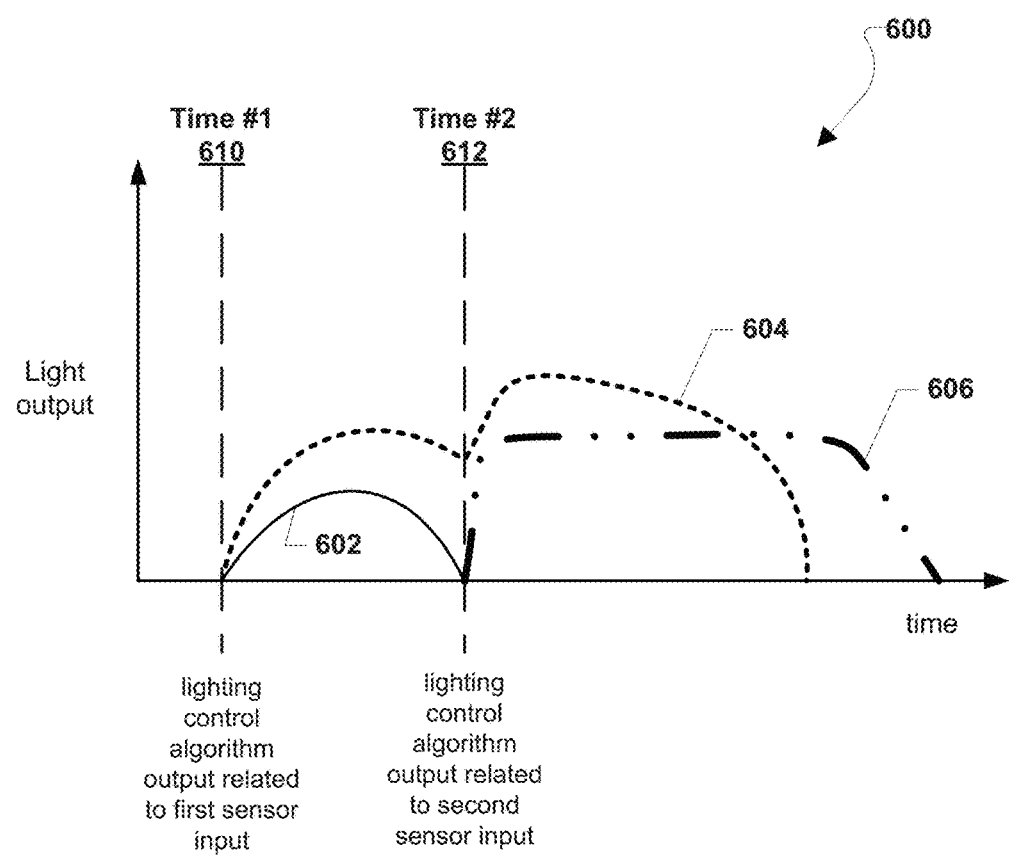
FIG. 6 is a diagram illustrating luminosity configurations for a plurality of lighting nodes within a lighting infrastructure over time according to some embodiments.

FIG. 6 shows a diagram 600 illustrating exemplary lighting configurations (e.g., luminosity configurations) for a plurality of lighting nodes within a lighting infrastructure over time. In other words, the diagram 600 shows how different sensor inputs over time may have different effects on different lights over time. In particular, sensor inputs may be received in relation to events occurring in the lighting infrastructure. For example, at the first time 610, a first event may occur that is represented by a first sensor input (e.g., audio sensor data indicating breaking glass, etc.), causing a first lighting control algorithm to output lighting model output data. In response to a computing device (e.g., remote server 140) compositing the one lighting model output data, a first lighting node may be commanded to configure its light output corresponding to the first output line 602 and a second lighting node may be commanded to configure its light output corresponding to the second output line 604 between the first time 610 and the second time 612. A third lighting node may be configured to stay 'off' during the period between the first time 610 and the second time 612.

However, at the second time 612, a second event may occur represented by a second sensor input (e.g., ambient light level sensor data, etc.), causing a second lighting control algorithm to output lighting model output data. In response to the computing device compositing together the two lighting model output datasets, the first lighting node may be commanded to shut 'off' (i.e., the first output line 602 may stop), the second lighting node may be commanded to configure its light output corresponding to the second output line 604 such that its luminosity is higher immediately after the second event, and the third lighting node may be commanded to configure its light output corresponding to the third output line 606.

Figure 7:
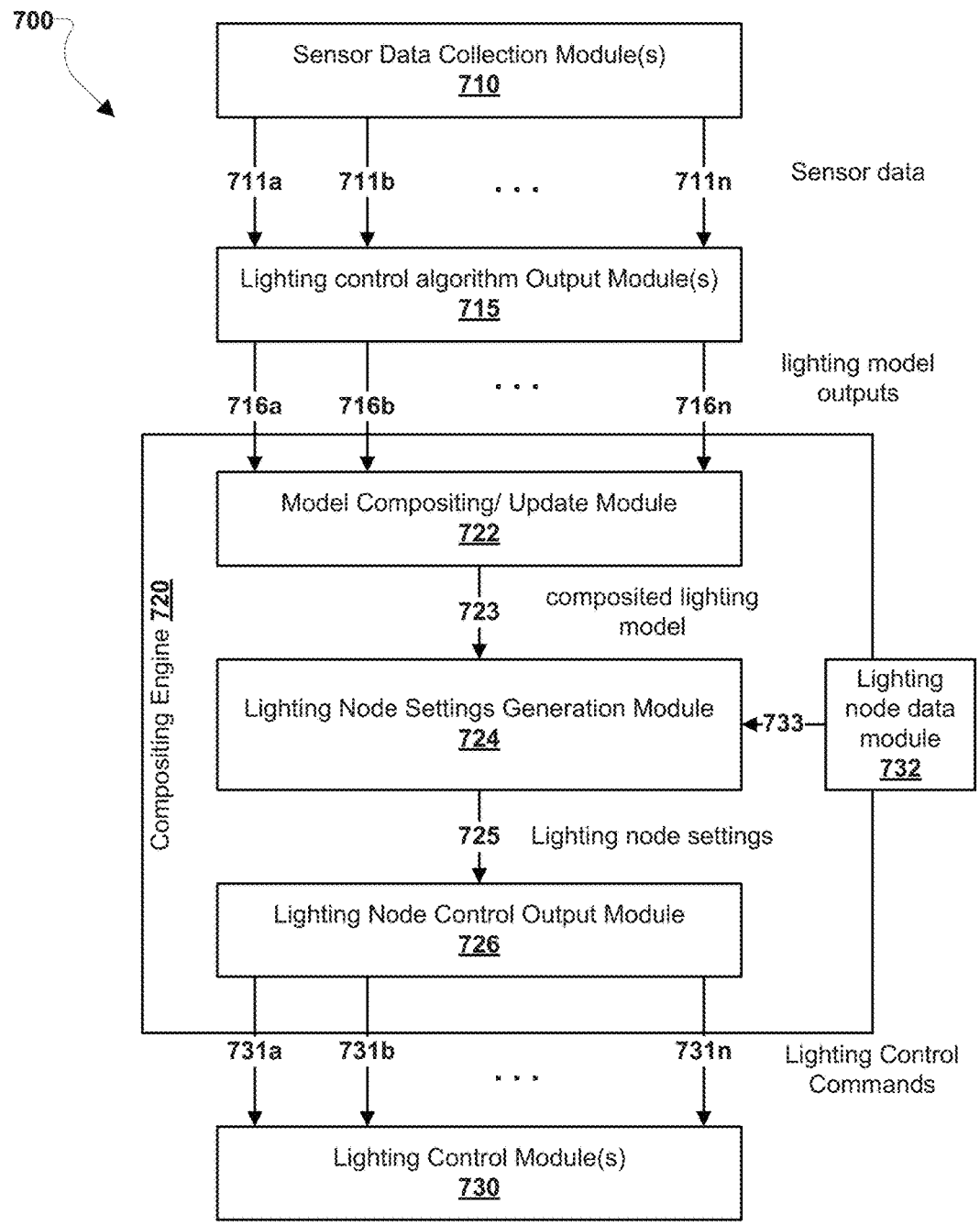
FIG. 7 is a component block diagram illustrating a compositing system architecture suitable for use in some embodiments.

As described herein, the embodiment techniques of this disclosure may be performed via any or all of a variety of computing devices within a lighting system associated with a lighting infrastructure. FIG. 7 illustrates an exemplary compositing system architecture 700 suitable for use in various embodiments. The various components of the architecture 700 may be implemented as modules, units, devices, software, applications, routines, logic, circuitry, hardware, operations, and/or various other forms of functionality. Further, in some embodiments, the various components of such an architecture 700 may be performed and/or included within any combination of the computing devices associated with the lighting infrastructure, such as a remote server 140, a lighting node 104, a sensor node 102, a combination lighting node 106, a local computing device 116 within the lighting infrastructure, a gateway device 110, etc.

The architecture 700 may include a sensor data collection module(s) 710 configured to obtain sensor data, such as gas, audio, and/or visual sensor data. In some embodiments, the sensor data collection module(s) 710 may be included within sensor nodes as described herein. The architecture 700 may include a lighting control algorithm output module(s) 715 configured to execute various lighting control algorithms (e.g., software associated with particular objectives for lighting, such as the directed lighting algorithm described above with reference to FIGS. 3A-3B, etc.) and utilize sensor data 711a-711n delivered from the sensor data collection module(s) 710. Within a compositing engine 720, the architecture 700 may include a model compositing/update module 722 configured to take various lighting control algorithm output datasets (or lighting model outputs 716a-716n) from the lighting control algorithm output module(s) 715. In some embodiments, the compositing engine 720 may be included within or otherwise supported by a remote server 140.

The model compositing/update module 722 may generate a composited lighting model by storing, updating, and otherwise combining the various lighting model outputs 716a-716n. For example, when new lighting model outputs are received over time, the model compositing/update module 722 may update (or overwrite) data used for generating composited lighting controls. To promote efficiency, compositing and/or updating operations may be performed at a set period, such as once every few seconds (e.g., 4 seconds, etc.).

In some embodiments, the model compositing/update module 722 may utilize preferences, weights, or other prioritization schemes when combining lighting model outputs 716a-716n so that certain lighting model outputs 716a-716n may have a greater effect than others when determining lighting node settings with a lighting node settings generation module 724. In some embodiments, the combining of the lighting model outputs 716a-716n may be done using a tree structure, such as shown below with reference to FIG. 10, or other data structure (e.g., a hash table that can indicate where a lighting model output/light function comes from, such as by providing coordinates of the sensor node related to the model, etc.) in order to determine if the output is relevant for a given comparison with a lighting node. Such data structures with look-up capabilities may also enable overwriting lighting model outputs 716a-716n with more up-to-date data. In some embodiments, the model compositing/update module 722 may evaluate a null setting for each lighting model output 716a-716n (e.g., light function) to determine whether it should be included within composited lighting model 723 at a given time. For example, when a certain lighting model output 716a-716n includes data that indicates it is inactive for a certain time period, the model compositing/update module 722 may ignore it for an iteration of a compositing routine.

The architecture 700 may include a lighting node settings generation module 724 that is configured to take a composited lighting model 723 from the model compositing/update module 722 and lighting node data 733 (e.g., geospatial coordinates, device characteristics, intensity relative to other luminaires, etc. of known lighting nodes within the lighting infrastructure) from a lighting node data module 732 in order to find sampled values for the lighting nodes. In other words, the lighting node settings generation module 724 may find discrete lighting configurations or settings for each lighting node based on a comparison of spatial and time data associated with the lighting nodes and the composited lighting model 723. For example, the lighting node settings generation module 724 may sample (or perform a look-up within) the composited lighting model 723 to identify sample values for known lighting nodes in order to re-create in reality the modeled composite light. In various embodiments, the lighting node settings generation module 724 may utilize data of lighting nodes indicating their locations on a continuous coordinate system (i.e., Cartesian, cylindrical, etc.) as a basis for spatially resolved information. For example, the lighting node settings generation module 724 may retrieve assigning unique geospatial positions for each lighting node from a database (i.e., the lighting node data module 732).

In some embodiments, the lighting node data module 732 may be a database or other stored data structure that is included within or otherwise accessible to a computing device, such as a database coupled to a remote server. In some embodiments, the lighting node settings generation module 724 may utilize a tree-traversal scheme such as described below with reference to FIG. 10 to iteratively use lighting model outputs 716a-716n to additively determine sampled values for lighting nodes. In some cases, such tree traversals may require substantial computing power due to high numbers of lighting control algorithm outputs (e.g., lighting functions) that are combined, and thus such traversals may or may not be performed at a remote server to improve performance and calculation response times.

In some embodiments, the lighting node settings generation module 724 may also determine whether particular lighting model outputs 716a-716n are relevant to individual lighting nodes prior to evaluating such models. Such determinations may be based on an area of impact of lighting model outputs 716a-716n. For example, a certain light function that is in general valid may not be valid for a particular lighting node based on a comparison of the area of effect of the light function as stored in a data structure (e.g., hash table) and the location of the lighting node within the lighting infrastructure. In some embodiments, for optimizing, the architecture 700 may also include database(s) that indicate the various lighting control algorithm model outputs that are relevant for individual lighting nodes and may only determine current lighting node settings based on compilations of applicable lighting model outputs (e.g., lighting functions) as indicated within such a database.

The architecture 700 may include a lighting node control output module 726 configured to generate lighting commands for the various lighting nodes based on the lighting node settings 725 (or lighting configurations) from the lighting node settings generation module 724. For example, the lighting node control output module 726 may generate particular instruction sets, codes, scripts, and/or other information that may be transmitted to individual lighting nodes for implementation. The lighting node control output module 726 may transmit such lighting control commands 731a-731n to lighting control module(s) 730 associated with the various lighting nodes of the lighting infrastructure, such as via wired or wireless connections. In some embodiments, the lighting control commands 731a-731n may include instructions or settings information that may control other attributes of lighting nodes than luminosity settings, such as light color. In some embodiments, the lighting control commands 731a-731n may be sent to lighting nodes at a set frequency (e.g., once every 4 seconds, etc.). Upon receipt of the lighting control commands 731a-731n, the lighting control module(s) 730 may then cause lighting nodes to adjust their configurations to emulate the lighting represented by the composited light model 723.

Figure 8A:
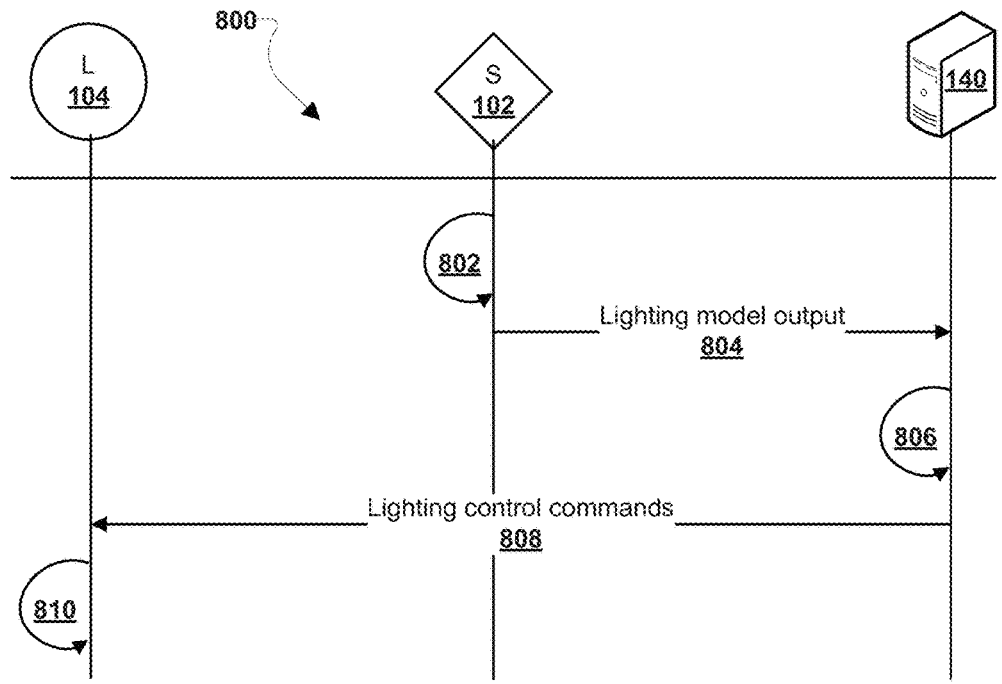
FIGS. 8A-8B are call flow diagrams illustrating communications between sensor nodes, lighting nodes, and a remote server according to some embodiments.
Figure 8B:
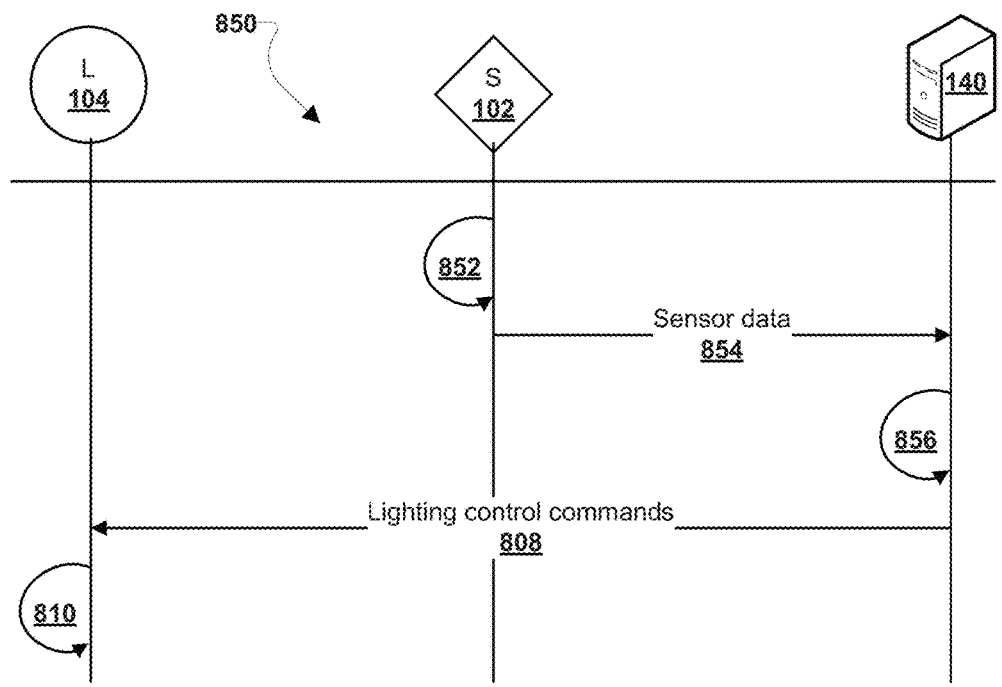

FIGS. 8A-8B illustrate embodiment call flow diagram 800, 850 illustrating communications between a sensor node 102, a lighting node 104, and a remote server 140 within a lighting system associated with a lighting infrastructure. With reference to diagram 800 of FIG. 8A, the sensor node 102 may be configured to perform operations 802 for gathering sensor data, such as by recording audio, video, and/or taking measurements based on various sensor units (e.g., gas sensors, motion sensors, etc.). The operations 802 may further include processing the gathered sensor data with one or more lighting control algorithms to generate lighting model output for each lighting control algorithm. The sensor node 102 may then transmit communications 804 for the remote server 140 including the generated lighting model output (s). In some embodiments, the operations 802 and the transmission of the communications 804 may be performed at the sensor node 102 via a sensor data collection module 710 and a lighting control algorithm output module 715 as described above with reference to FIG. 7. In some embodiments, the sensor node 102 may perform operations to gather the sensor data, however may offload the lighting control algorithm operations to another local device within the lighting infrastructure, such as a gateway device 110 or a local computing device 116.

In response to receiving the communications 804, the remote server 140 may perform operations 806 for compositing the received lighting model output(s) to obtain a composited lighting model. Using the composited lighting model, the remote server 140 may obtain sampled values that indicate how the lighting node 104 should be configured and generate lighting control commands to instruct the lighting node 104 as to how to best accommodate the composited lighting model. The remote server 140 may then transmit communications 808 including the lighting control commands to the lighting node 104. In some embodiments, the operations 806 and the transmission of the lighting control commands may be performed at the remote server 140 via functionalities of a compositing engine 720 as described above.

In response to receiving the lighting control commands via the communications 808, the lighting node 104 may perform operations 810 to configure itself based on the commands, such as by increasing/decreasing the luminosity of its lighting element (e.g., LED) and/or adjusting other lighting characteristics based on the communications 808 (e.g., light color). In some embodiments, the operations 810 may be performed at the lighting node 104 via a lighting control module 730 as described above with reference to FIG. 7.

FIG. 8B illustrates a similar call flow diagram 850 as shown above with reference to FIG. 8A, except that the call flow diagram 850 indicates that more of the processing prior to the compositing operations 806 may be performed at the remote server 140. In particular, the sensor node 102 may be configured only to gather sensor data with the operations 852, and then transmit that gathered sensor data via communications 854 to the remote server 140. Accordingly, the remote server may be configured to perform operations 856 for both executing various lighting control algorithms with the received sensor data to obtain lighting model outputs, but also perform the various compositing operations described above. The remote server 140 may then transmit the lighting control commands via communications 808 to the lighting node 104 as described above.

Figure 9:
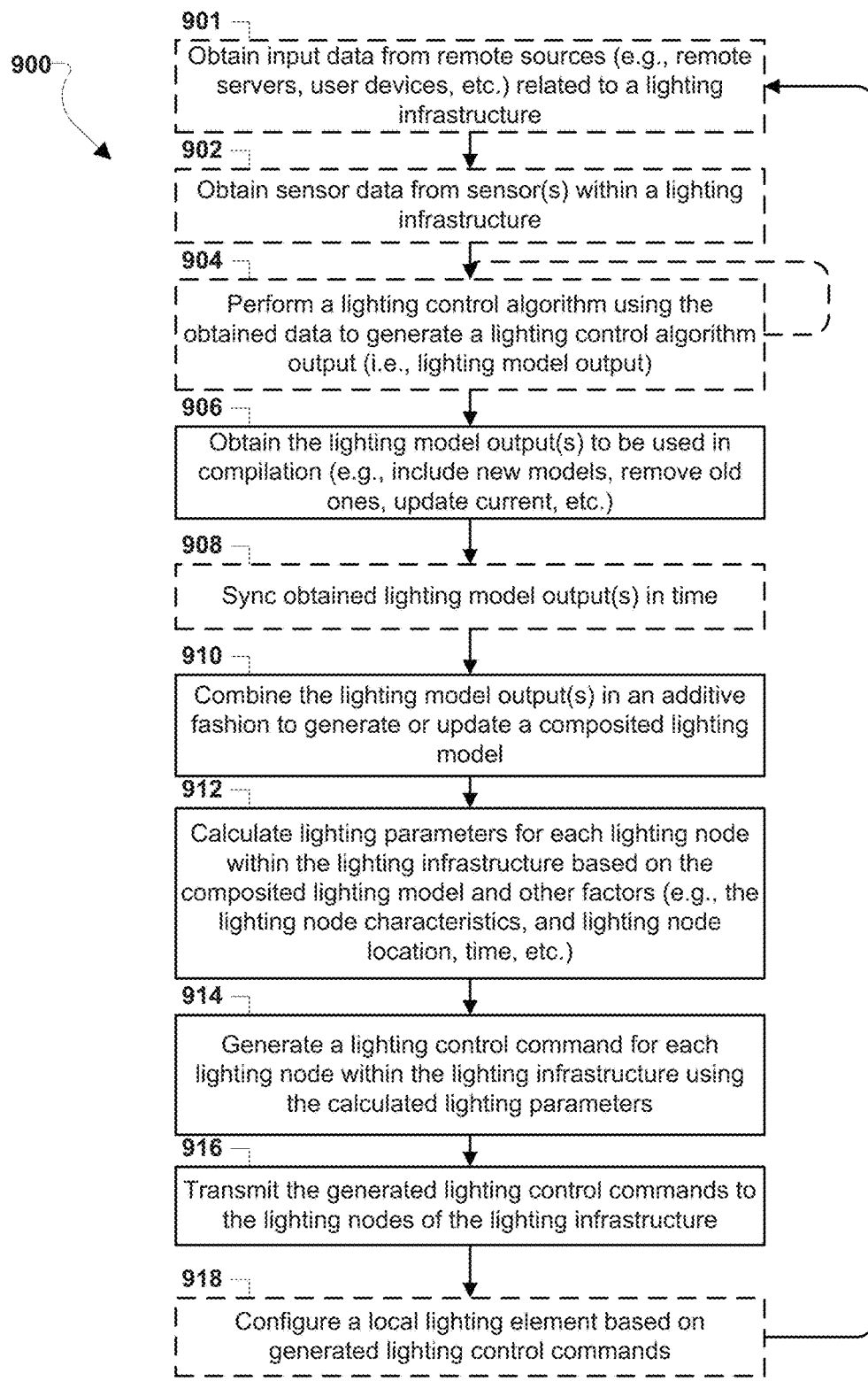
FIG. 9 is a process flow diagram illustrating an embodiment method for a computing device to generate lighting control commands for lighting nodes based on composited lighting models.

FIG. 9 illustrates an embodiment method 900 for a computing device (e.g., a remote server 140) to generate lighting control commands for lighting nodes of a lighting system associated with a lighting infrastructure based on composited lighting models. In various embodiments, the operations of the method 900 may be performed by one or more computing devices, such as a remote server 140, a local computing device 116 within the lighting infrastructure, etc.

In optional block 901, the processor of the computing device may obtain input data from remote sources (e.g., remote servers, user devices, etc.) related to a lighting infrastructure. For example, the computing device may receive data from a mobile device utilizing an interface for providing user requests regarding lighting in lighting infrastructures such as described below in FIG. 13. In some embodiments, data from such remote sources may be associated with particular lighting control algorithms, such as those that are designed to adjust lighting within the lighting infrastructure based on overcast sky conditions or user requests (e.g., requests to shine light on a vehicle in a garage, etc.).

In optional block 902, the processor of the computing device may obtain sensor data from one or more sensors within the lighting infrastructure. For example, the computing device may receive data packets from one or more sensors (directly or indirectly via communications from a gateway device, a local computing device, etc.) that indicate motion sensor data, gas sensor data, ambient light sensor data, etc. In various embodiments, such raw sensor data may be reported in communications that include data (e.g., sensor identifiers, etc.) that may be associated with the lighting infrastructure, the sensor node(s), etc. In some embodiments, obtained sensor data (or sensory input) may be animated dynamically and geospatially. For example, obtained sensor data may represent sensor data gathered by sensors over a period of time, such that the data represents changing levels of information (e.g., increasing sound due to an approach or other activity, a movement path from a motion detector, etc.).

In optional block 904, the processor of the computing device may perform a lighting control algorithm using the obtained data (e.g., the obtained sensor data and/or the obtained input data from remote sources) to generate a lighting output model. As described herein, lighting control algorithms may not account for actual locations of lighting nodes within the lighting infrastructure, but instead may be used to output ideal lighting model outputs that may be sampled as described below. For example, the computing device may perform a certain lighting control algorithm to generate output data that simply indicates that a certain animated "image" of light be projected around a location of a detected presence based on sensor data. Accordingly, performing such individual lighting control algorithms may generate lighting model outputs that indicate how ideal lighting should be implemented within the lighting infrastructure over a period of time with relation to a particular objective (e.g., presence/occupancy detection, pathing or routing, information communication via lighting, etc.). For example, one lighting model output may represent simulation data as to how lighting within a section of the lighting infrastructure should ramp up and then down over the span of a few seconds, minutes, etc. in order to accommodate a detected movement by a human or vehicle. The operations in optional block 904 may optionally be performed repeatedly for various lighting control algorithms using various portions of the obtained data from optional blocks 901-902.

In some embodiments, lighting model outputs may indicate whether lighting should ramp up or down over a time period and/or persist (or stays constant at a steady-stated) for an indefinite amount of time. For example, one lighting model output may indicate that after a brief period of dimming, lighting in a particular area should stay at a low lighting level for an indefinite period of time. As another example, another lighting model output may indicate that after a brief period of increasing luminosity, lighting in a particular area should stay at a full lighting level for an indefinite period of time. Lighting model output data may indicate that lighting levels should remain constant for a time period, or alternatively, until a certain type of event or message is encountered. For example, lighting model outputs may indicate lighting in a certain corner of a parking garage should stay off until any presence is indicated. Such detailed information within lighting model output data may be used by the computing device to optimize compositing and sampling as described below. For example, when lighting model output from one lighting control algorithm indicates a constant state of no lighting in a certain area of the lighting infrastructure, the computing device may avoid evaluating the lighting model output with any lighting nodes that have coordinates within that space.

Exemplary lighting control algorithms may include algorithms that provide baseline (or constant) lighting for areas of the lighting infrastructure and/or that require dynamic effects based on arbitrary sensor data, such as based on sensor data from a mesh of occupancy sensors, each acting in isolation. For example, a dynamic lighting control algorithm may be performed by the computing device to create a dynamic lighting effect in a parking garage lighting infrastructure that maintains a "bubble" of light around partially occupied parking spaces. In some embodiments, static baseline lighting control algorithms (or lighting functions) may be executed to generate output data that may be composited in during scheduled periods to maintain a minimum level of illumination in the lighting infrastructure, wherein such a baseline function may or may not be temporally constant or spatially uniform.

The following is an illustration of an exemplary lighting control algorithm that may be performed by the computing device using obtained sensor data. The computing device may execute a proximity lighting control algorithm that may generate lighting model output data including a baseline 10% constant light output over one half of a lighting infrastructure floor (e.g., a parking deck floor), but a zero light baseline over the other half of the floor. In response to detected occupancy events (e.g., via motion sensors, etc.), the proximity lighting control algorithm may generate an additional temporary light field (e.g., a paraboloid shape of light) that may be centered on the sensor detecting the occupancy, wherein the temporary light field may indicate a lit area may have a peak of 70% light intensity, fading to 0% over a radius of 40 meters. The computing device may generate output data that clears the additional, temporary light field after a few minutes (e.g., 2 minutes) have elapsed without any additional detected presence.

In some embodiments, lighting control algorithms when executed by the computing device may utilize hysteresis (or other historical data) in order to refine and/or otherwise adjust the output data. For example, using hysteresis data gathered over previous executions of the lighting control algorithm described above, the computing device may generate lighting model output data that indicates a light field may fade out of the total lighting caused by the lighting control algorithm after a few seconds (e.g., 5 seconds, etc.) instead of a few minutes.

It should be appreciated that the operations in optional blocks 901-904 may be optional as these operations may or may not be performed by the computing device or other devices that report data to the computing device.

In block 906, the processor of the computing device may obtain lighting control algorithm output(s) (i.e., lighting model output(s)) to be used in compilation operations. For example, the computing device may obtain, based on its own operations or from received transmissions from other devices, data indicating lighting model outputs that encapsulate lighting behavior over time (i.e., animated data). The operations in block 906 may include the computing device updating previously obtained lighting model outputs for particular lighting control algorithms, removing no longer valid lighting model outputs (e.g., out of date, null, corresponding to uninstalled/broken sensor nodes, etc.), and/or adding new lighting model outputs (e.g., data from newly installed sensor nodes, etc.). In some embodiments, the lighting model outputs may be obtained from the computing device itself when configured to execute the various lighting control algorithms with the operations in optional block 904. In some embodiments, the computing devices may store the lighting model output(s) in a local storage unit and/or other accessible data storage units (e.g., databases, etc.). For example, obtaining the lighting model output(s) may include retrieving the lighting model output(s) from a local storage unit coupled to the computing device, wherein the lighting model output(s) may be stored based on transmission from other devices and/or in response to the computing device performing the operations of optional block 904.

As described above, the obtained lighting model output(s) may be animated dynamically and geospatially. For example, obtained output data may include continuous lighting data for a particular section (or the entirety) of the lighting infrastructure over a period of time. The following is an illustration of exemplary operations regarding animated output data from a lighting control algorithm executed by the computing device. In response to sensor data indicating presence within the lighting infrastructure (e.g., a vehicle, a human walking, etc.), the computing device executing a presence lighting control algorithm generates lighting model output data indicating that additional lighting should be on in the area of the detected presence. Further, in response to the obtained sensor data indicated that the presence did not remain in that location for more than a short period (i.e., no more presence), the computing device may generate lighting model output data indicating the effect of the additional lighting fades out over a time period.

In optional block 908, the processor of the computing device may sync the obtained lighting model output(s) in time. In other words, due to transmission delays and other differences in the possible manners that either sensor data and/or lighting model outputs may be obtained by the computing device, data may need to be synced so that compositing may produce accurate aggregations of the various lighting model outputs. For example, the computing device may offset simulation data applicable to a first time period that was obtained related to a directed lighting control algorithm in order to have it sync in time with a presence lighting control algorithm output that was obtained by the computing device at a different time but that represents lighting model data that is also applicable to the first period. Such syncing may be accomplished based on timestamp information stored and/or otherwise communicated in associated with the obtained lighting model output(s).

In block 910, the processor of the computing device may combine the lighting model output(s) in an additive fashion to generate (or update) a composited lighting model. For example, the computing device may composite together a first lighting model output (e.g., low, default lighting configurations for all lighting nodes within the lighting infrastructure) with a second lighting model output in the shape of a cone or parabolic bowl that is associated with a lighting control algorithm related to occupancy sensor data that is centered on a location of an occupancy detection and that extends some configurable radius. The composited lighting model may be a continuous, time-varying illumination model that does not directly depend on the locations of the lighting nodes, but instead is a mathematical description of optimal, composited lighting within the lighting infrastructure. The composited lighting model may thus illustrate an ideal lighting solution that is separate from projecting such a solution onto the real world (i.e., via lighting node configurations). In some embodiments, the compositing operations of block 910 may be performed by a compositing engine as described above with reference to FIG. 7. In some embodiments, the combining or compositing operations may include combining mathematical representations of each of a plurality of lighting model outputs, such as by performing operations to combine lighting functions associated with different lighting control algorithms, such as shown below with reference to FIG. 10.

In some embodiments, the computing device may utilize weighting, ranking, and/or other prioritization schemes when combining the various lighting model outputs in order to allow certain light control algorithms to have greater impact on eventual lighting node configurations. For example, the computing device may combine a first and second lighting function such that the effects of the first light function on the composited light model may be scaled up in order to generate higher luminosity effects to lighting nodes than the second lighting function.

In some embodiments, when combining individual lighting model outputs (e.g., individual lighting functions) together to produce more complicated illumination functions (i.e., the composited lighting model), the computing device may utilize conventional blending and/or compositing techniques, such as Porter/Duff techniques for blending. For example, as the convolutional interpretation of an alpha channel in a light field of a lighting control algorithm output may obey the same basic algebraic properties as a scalar alpha channel used in a conventional technique (e.g., Porter/Duff technique), the computing device may use certain compositing algebra to combine lighting function outputs.

Figure 10:
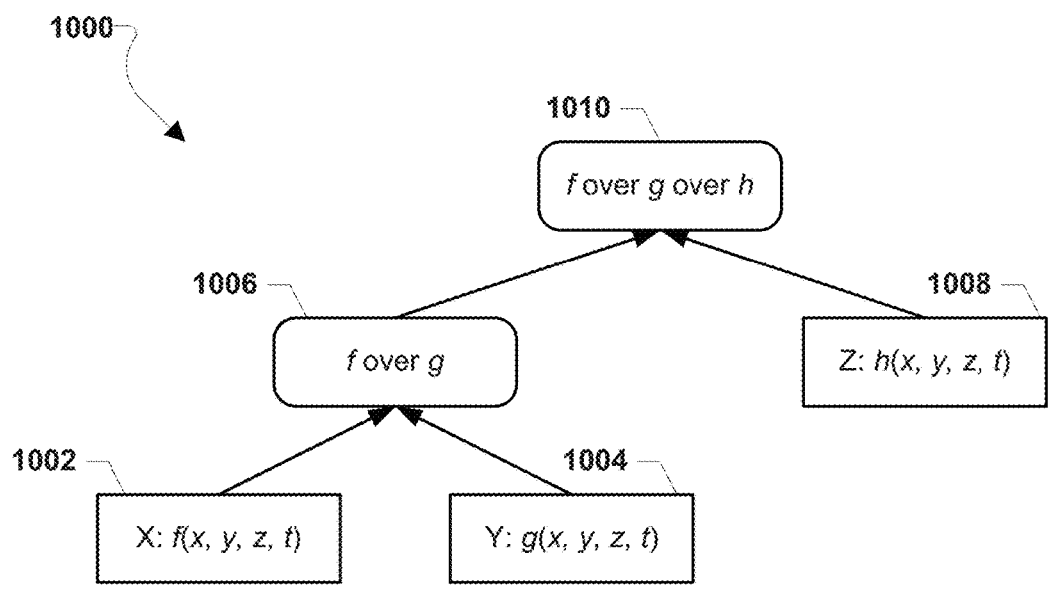
FIG. 10 is a diagram illustrating a tree structure that may be used for generating compositing lighting models according to some embodiments.

In some embodiments, the computing device may combine lighting model output representations (e.g., lighting functions) using an "over" operator (e.g., an "over" operator as used in Porter/Duff techniques), as shown in FIG. 10 below. Such an "over" operator may be used by the computing device to combine two vectors with respective alpha values using the following exemplary formula:

$$Ca\alpha a + Cb\alpha b(1\alpha a).$$

wherein Ca and Cb are vectors, and αa and αb are the respective alpha values. The "over" operator may be used to produce a natural-looking blending effect when lighting model output data (e.g., output light fields) overlap.

In some embodiments, the computing device may optimize the compositing operations (or combining operations) by analytically excluding identity terms associated with any of the lighting model outputs. In some embodiments, the compositing or combining operations may include mathematically combining representations of Bezier curves each associated with a different lighting control algorithm. The combinations of representations of Bezier curves may require a fixed amount of computation overhead because as the combination of Bezier curves may merely result in another Bezier curve.

In some embodiments, sensor data collected or obtained over time from the lighting infrastructure may be analyzed to improve the parameters that define optimal lighting conditions. For example, the computing device may perform machine learning operations to identify trends or other information that may be used to perturb or otherwise adjust subsequent composited lighting models.

In some embodiments, the operations in block 910 may include normalization operations, transformations, or other calculations to smooth or otherwise meld the various lighting model outputs together in a pleasing visual manner.

In block 912, the processor of the computing device may calculate lighting parameters for each lighting node within the lighting infrastructure based on the composited lighting model and various factors associated with each lighting node. Such other factors may include lighting node locations within the lighting infrastructure, time, and individual lighting node characteristics and/or functionalities. In general, the computing device may project the continuous illumination model obtained from the compositing onto the real-world lighting nodes. In particular, the computing device may use spatial coordinates to "sample" the composited lighting model to obtain configuration parameters for the lighting nodes that may allow a real-world implementation of the ideal lighting represented by the composited lighting model. For example, the computing device may identify sampled values for each lighting node by performing a look-up on the composited lighting model data using each lighting node's coordinates within the lighting infrastructure. The computing device may determine where the predefined x, y, and z coordinates (or Cartesian coordinates) of each lighting node fall within the composited lighting model, and may interpret the lighting needed from the lighting node based on its relative positioning within the composited lighting model. In various embodiments, the coordinates for each lighting node may be retrieved from stored data, such as database records associated with the lighting nodes.

Further, as the composited lighting model may include data representing lighting changes over a time period (i.e., the composited lighting model may be animated), the computing device may utilize a time variable in combination with the spatial/location coordinates of the lighting node to identify lighting configurations at the lighting node's coordinates and over a period of time. In this way, the computing device may identify how each lighting node of the lighting infrastructure may be controlled to produce the ideal composited lighting model generated via the various lighting output models.

In some embodiments, the sampling procedure (e.g., projecting light function(s) combined ideal output onto the real-world lighting nodes) may be performed by a control process executed by individual lighting nodes. For example, the control process may periodically sample a provided light function or the composited lighting model at the lighting node's current location in space and time. The control process may be run on a microprocessor embedded in the lighting node. In such an embodiment scenario, the lighting nodes may receive updated composited lighting models (e.g., light functions) via a network connection from a remote device (e.g., a remote server 140 performing compositing operations via a compositing engine) whenever there are updates desired light function changes.

In some embodiments, the calculations may include evaluating various stored characteristics of the lighting nodes to determine how they should be configured to achieve lighting objectives based on the composited lighting mode. For example, the computing device may evaluate one or more of the following characteristics in order to calculate a luminosity setting for a particular lighting node, a maximum luminosity level, a number of LEDs, a manufacturer, and a model type.

In some embodiments, calculated lighting parameters may be either assigned or algorithmically learned in order to further optimize lighting output.

In block 914, the processor of the computing device may generate a lighting control command for each lighting node within the lighting infrastructure using the calculated lighting parameters. For example, the computing device may convert the calculated lighting parameters into control instructions that may be executed by an individual lighting node to adjust its light intensity and/or light color. In various embodiments, the lighting control command may indicate a luminosity level to be used at a lighting node, wherein the luminosity level may be a luminosity configuration inclusively between no luminosity and full luminosity. For example, the lighting control command may indicate a lighting node's LED bulb may be turned on to 50% of its maximum luminosity.

In some embodiments, the generated lighting control command(s) may include settings to be implemented by a lighting device over a period of time (i.e., the generated lighting output may be animated dynamically and geospatially). For example, generated lighting control commands may include instructions that may be performed by a lighting node for changing its luminosity periodically (e.g., dimming, ramping-up, etc.) over a time period, such as over the course of several seconds (e.g., 4 seconds). In some embodiments, the lighting control command(s) may also be used to configure or otherwise affect various attributes or functionalities of lighting nodes, including light color settings and/or energy use for lighting elements.

In some embodiments, the lighting control commands may include data that may be used by various functionalities associated with and/or otherwise coupled to a lighting device, such as a speaker, camera, sensor, or other unit. For example, the generated lighting control command may include commands instruction the lighting node to render an audio file via a connected speaker in addition to instructions for adjusting the light intensity output of the lighting node.

In block 916, the processor of the computing device may transmit the generated lighting control commands to the lighting nodes of the lighting infrastructure. For example, the computing device may transmit data messages over a local area network, a wide area network, and/or internally to other devices or units configured with lighting elements that may be set to emulate the composited lighting model. In some embodiments, any of the operations of blocks 904-916 may be performed via modules of a compositing engine 720 as described above.

In optional block 918, the processor of the computing device may configure a local lighting element (or other lighting functionality) based on generated lighting control commands. The operations of optional block 918 may be optional when the computing device is not itself a lighting node. In some embodiments, the operations of optional block 918 may be performed via a lighting control module 730 as described above. The computing device may then continue with the operations in optional block 901.

FIG. 10 shows a diagram of an exemplary structure that may be used by a computing device for compositing lighting model outputs according to some embodiments. Light functions representing lighting model outputs may be arranged as a composited tree 1000. With reference to the composited tree 1000, exemplary light functions $f$, $g$, and $h$ relate to labels X, Y, and Z and tree elements 1002, 1004, and 1008, respectively.

When using alpha pre-multiplied light color channels (or no light color channels as is the case with basic dimming), an "over" operator (e.g., an "over" operator as described above) may be associative and commutative. Such associativity and commutativity may enable structuring composited light functions into trees, where the light function of inner tree nodes may be defined as the composition of the light functions of descendent tree nodes using the "over" operator. For example, the first element 1002 (e.g., the $f$ light function) and the second element 1004 (e.g., the g light function) may be associated with the "over" operator at compositing element 1006. Further, the compositing element 1006 and the third element 1008 (e.g., the h light function) may be associated with the "over" operator at compositing element 1010 (e.g., $f$ over g over h). In other words, the final compositing element 1010 may represent a composited light model that may be used by the computing device to determine sampled values for various lighting nodes based on light functions $f$ g, and h.

By labeling nodes in the composited tree 1000, the computing device may swap out or remove specific constituents of a composite light function. For example, to fade out the influence of a light function (e.g., light function $f$ element 1002), the computing device may replace the element 1002 in the composited tree 1000 with a modified version having an alpha value that interpolates to '0' over the course of a time interval following the time of the swap. The computing device (e.g., via a compositing engine 720) may make such adjustments to composited tree 1000 in response to external events (e.g., newly received sensor data and/or lighting model outputs, etc.), ensuring that lighting control commands are generated using up-to-date version of the current composited lighting function.

In some embodiments, the computing device (e.g., via the compositing engine 720) may also heavily optimize the composited tree 1000 such that all identity terms are removed when sampling using lighting node locations. Since many primitive lighting functions go to zero beyond some spatial and sometimes temporal thresholds, certain terms may be removed from the compositions of certain trees that will always be evaluated at a certain location, and after a certain time. For example, a light function that fades to zero after a fixed time may be removed by the computing device from the composition tree 1000 after that time passes.

Figure 11:
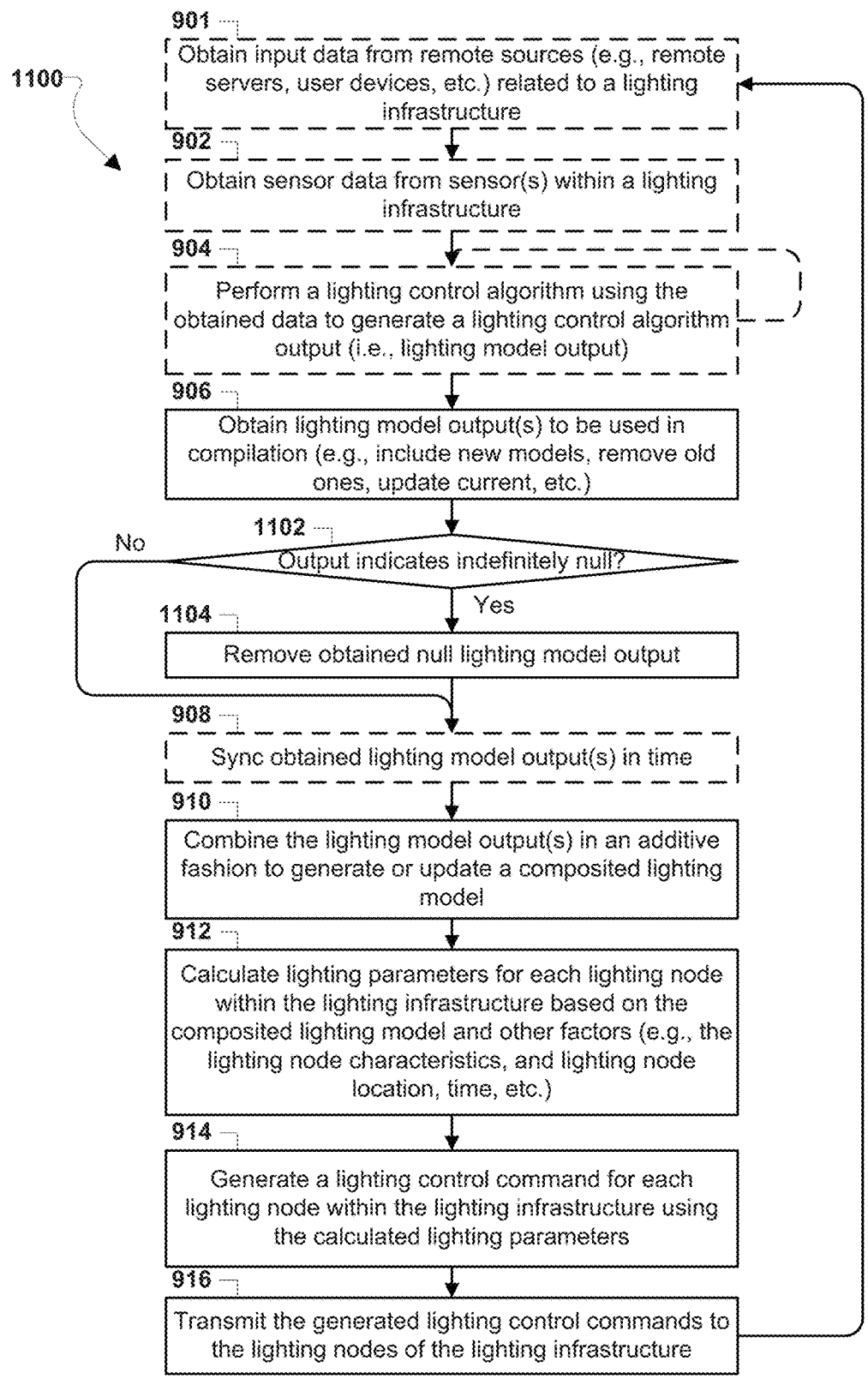
FIG. 11 is a process flow diagram illustrating an embodiment method for a computing device to remove unnecessary data when generating lighting control commands for lighting nodes based on composited lighting models.

FIG. 11 illustrates an embodiment method 1100 for a computing device to remove unnecessary data when generating lighting control commands for lighting nodes within a lighting infrastructure based on composited lighting models. The method 1100 is similar to the method 900 described above, except that the method 1100 includes operations for removing particular lighting model outputs (e.g., lighting functions) from consideration based on their applicability to a given lighting node within the lighting infrastructure. For example, the computing device may improve the performance of compositing functions by dynamically adding, removing, and/or replacing terms of a composited lighting function in response to sensory or analytical input (e.g., removing a presence-based lighting control algorithm output from compositing when it has a null value based on no detected presence, etc.).

The processor of the computing device may perform operations of blocks 901-906 as described above for like numbered blocks with reference to FIG. 9. In determination block 1102, the processor of the computing device may determine whether one or more of the obtained lighting model outputs indicates an indefinitely null value or property. For example, the computing device may evaluate output data to determine whether prescribed lighting levels are set to constant, steady-state values (e.g., no light, etc.). In response to determining that an obtained lighting control algorithm output is indefinitely null (i.e., determination block 1102="Yes"), the processor of the computing device may remove the obtained null lighting control algorithm output in block 1104. As described above, the computing device may be configured to remove individual lighting model outputs that do not have to be evaluated based on their indication of constant values. For example, when a particular area of the lighting infrastructure is associated with lighting model output from a certain lighting control algorithm that is either not active for a time or that generates output data indicating no lighting is required in the particular area, the computing device may avoid compositing or otherwise evaluating that output data. This may reduce computing loads.

In some embodiments, based on subsequently obtained lighting model output(s), previously removed lighting model outputs may be restored within the composited lighting model. For example, when a previously removed lighting control algorithm output is dramatically adjusted due to new sensor data (e.g., a glass-breaking event, occupancy event, etc.), the computing device may receive updated lighting model output data that may be used within the compositing operations.

In response to determining that an obtained lighting control algorithm output is not indefinitely null (i.e., determination block 1102="No"), or in response to performing the operations of block 1104, the processor of the computing device may then perform operations of blocks 908-916 as described above for like numbered blocks with reference to FIG. 9, and then may continue with the operations of optional block 901.

Figure 12:
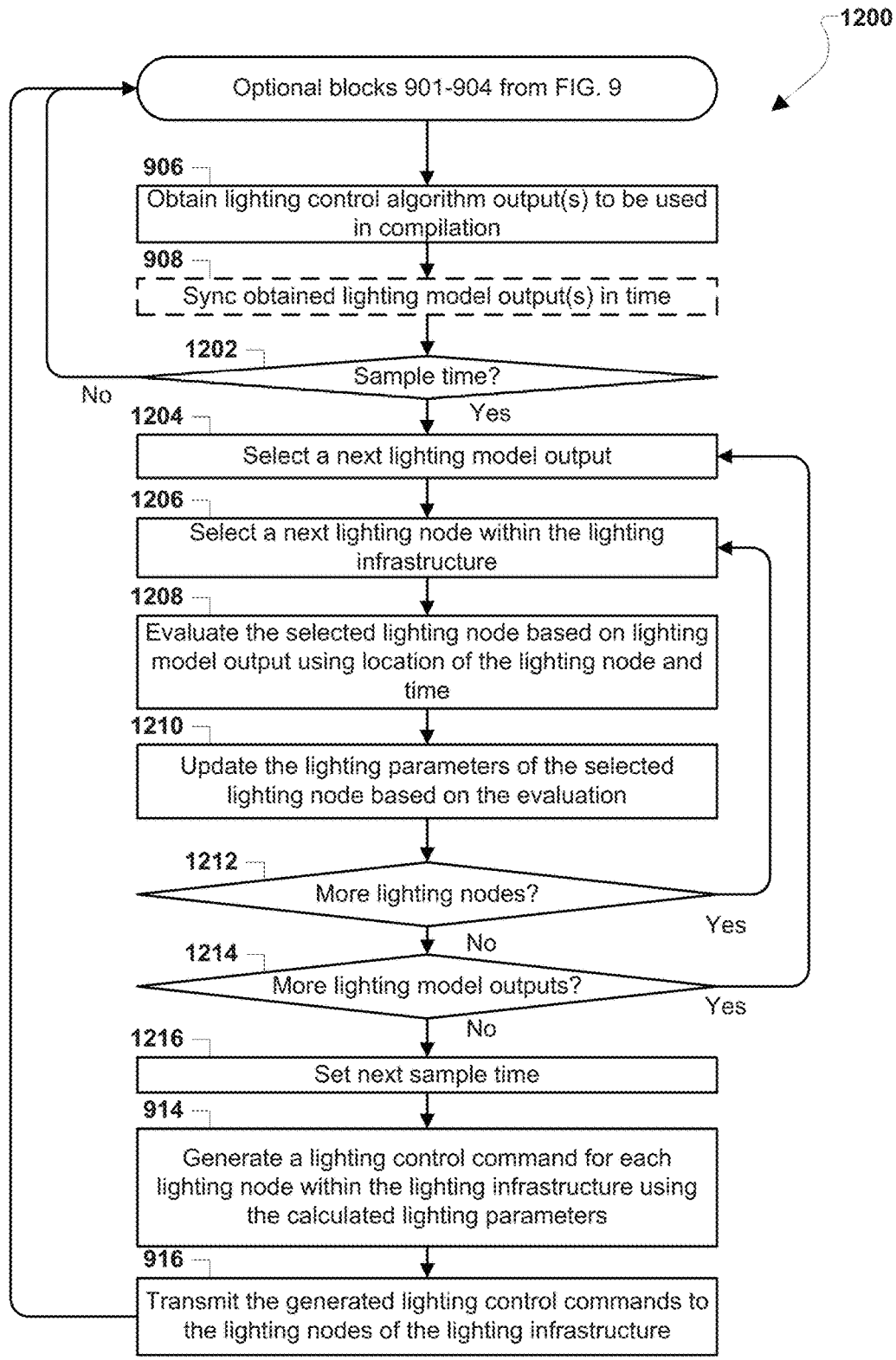
FIG. 12 is a process flow diagram illustrating an embodiment method for a computing device to generate lighting control commands for lighting nodes using composited lighting models in an iterative manner.

FIG. 12 illustrates an embodiment method 1200 for a computing device to generate lighting control commands for lighting nodes within a lighting infrastructure based on composited lighting models in an iterative manner. The method 1200 is similar to the method 900 described above, except that the method 1200 includes operations for using a sample time to iteratively evaluate how individual lighting nodes may be configured based on composited lighting models. In some embodiments, the sampling operations may be performed by the computing device at a regular, quick interval, such as a number of seconds (e.g., 4 seconds, etc.).

The processor of the computing device may perform operations of blocks 901-908 as described above for like numbered blocks with reference to FIG. 9. In determination block 1202, the processor of the computing device may determine whether it is time to identify sample values for lighting nodes of the lighting infrastructure. For example, the computing device may evaluate a system variable or other updating stored data, counter, or clock to determine whether the status of the system variable or other updating stored data, counter, or clock indicates a sample time has expired. In response to determining it is not time to identify sample values (i.e., determination block 1202="No"), the processor of the computing may continue with the operations of optional block 901.

In response to determining it is time to identify sample values (i.e., determination block 1202="Yes"), the processor of the computing device may select a next lighting model output to evaluate in block 1204. In block 1206, the processor of the computing device may select a next lighting node within the lighting infrastructure, such as the first in a list or data table of a plurality of lighting nodes known to be within the lighting infrastructure. In block 1208, the processor of the computing device may evaluate the selected lighting node based on the selected lighting model output using at least a location of the lighting node and a time. For example, the computing device may identify a lighting configuration for the selected lighting node's x, y, and z coordinates and a current time step based on the lighting function or other mathematical representation of the selected lighting control algorithm. In block 1210, the processor of the computing device may update lighting parameters of the selected lighting node based on the evaluation. Such updating may be an additive or cumulative adjustment that may continually change with the evaluation of each lighting model output.

In determination block 1212, the processor of the computing device may determine whether there are more lighting nodes to evaluate. For example, the computing device may determine whether it has iterated through all the lighting nodes known to be in the lighting infrastructure for evaluation with the currently selected lighting model output. In response to determining that there are more lighting nodes to evaluate (i.e., determination block 1212="Yes"), the computing device may continue with the operations in block 1206 for selecting a next lighting node. In response to determining that there are no more lighting nodes to evaluate (i.e., determination block 1212="No"), the processor of the computing device may determine whether there are more lighting control algorithm outputs to evaluate in determination block 1214. In response to determining that there are more lighting control algorithm outputs to evaluate (i.e., determination block 1214="Yes"), the computing device may continue with the operations in block 1204 for selecting a next lighting control algorithm output, which then may be used for evaluations with each of the lighting nodes.

In response to determining that there are no more lighting control algorithm outputs to evaluate (i.e., determination block 1214="No"), the processor of the computing device may set a next sample time (e.g., 4 seconds from current time, etc.) in block 1216, perform the operations of blocks 914-916 as described above for like numbered blocks with reference to FIG. 9, and then may continue with the operations of optional block 901.

Figure 13:
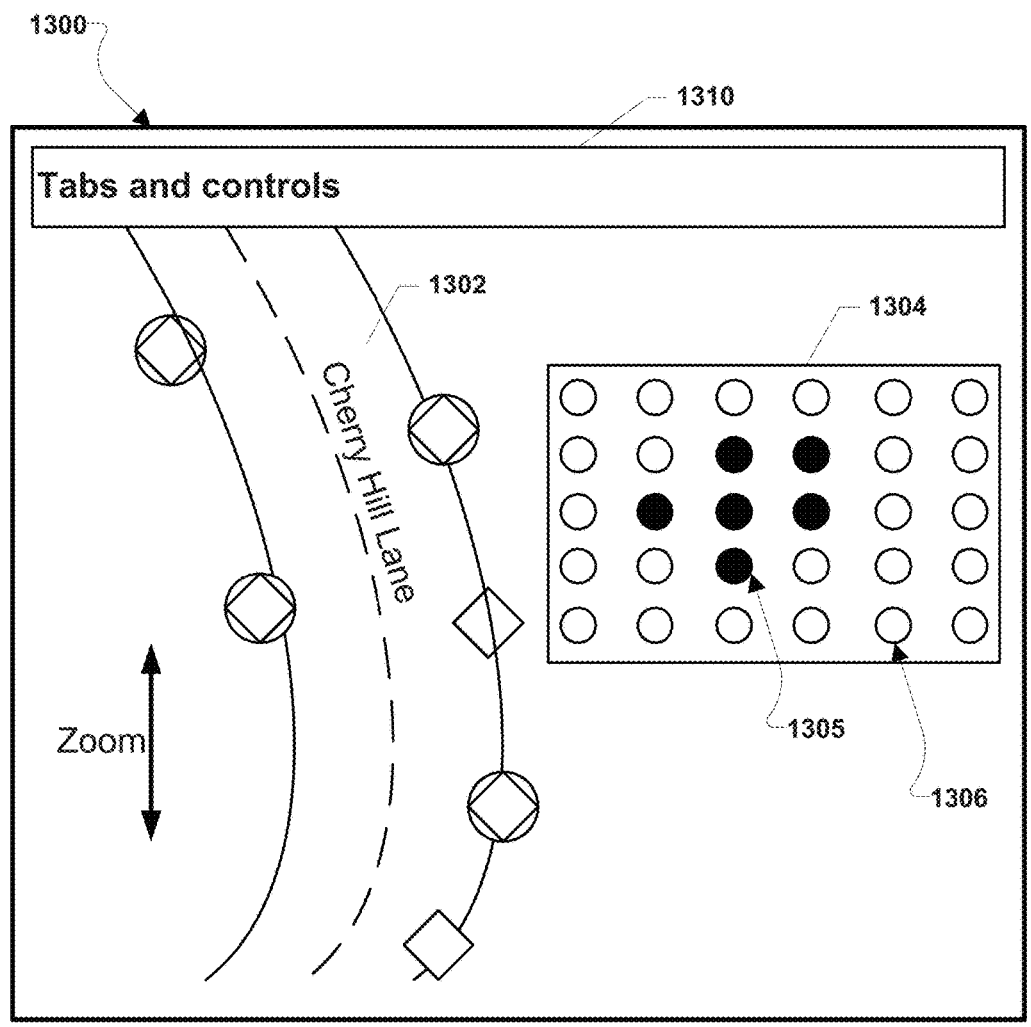
FIG. 13 is a diagram illustrating a graphical user interface suitable for use with some embodiments.

FIG. 13 illustrates an exemplary software interface 1300 (or graphical user interface (GUI)) that displays networked lighting infrastructures with sensors and lighting nodes that may produce sensor data or use lighting configuration data that may be animated dynamically and geospatially. For example, such an interface 1300 may be used to superimpose a composited lighting model on depictions of lighting nodes (e.g., luminaires) of lighting infrastructures. For example, as shown in FIG. 13, the interface 1300 may show a representation of a roadway 1302 lighting infrastructure equipped with various nodes (e.g., combination lighting nodes, sensors, etc.). The interface 1300 may also show a representation of another infrastructure 1304 (e.g., parking garage, etc.) with a plurality of lighting nodes 1306 that are configured to be in a fully luminous state and another plurality of lighting nodes 1305 that are configured to be in a dimmed or 'off' state.

In some embodiments, the interface 1300 may include various controls 1310, such as graphical elements (e.g., tabs, buttons, etc.) that may be used by a user to indicate commands, requests, and/or other information that may be transmitted to another computing device (e.g., remote server 140, etc.) for affecting composited lighting models of one or more lighting infrastructures. For example, a user may press a GUI button on the interface 1300 that indicates the user requests that lighting within a lighting infrastructure be raised, lowered, etc. In some embodiments, such user-supplied information may be processed via a dedicated lighting control algorithm whose output may be composited together with other output datasets to generate a composited lighting model used for assigning discrete parameters to lighting nodes of a lighting infrastructure as described herein. In various embodiments, the interface 1300 may be rendered on a user device, such as a laptop computer or a mobile device used by a user located within a lighting infrastructure.

Figure 14A:
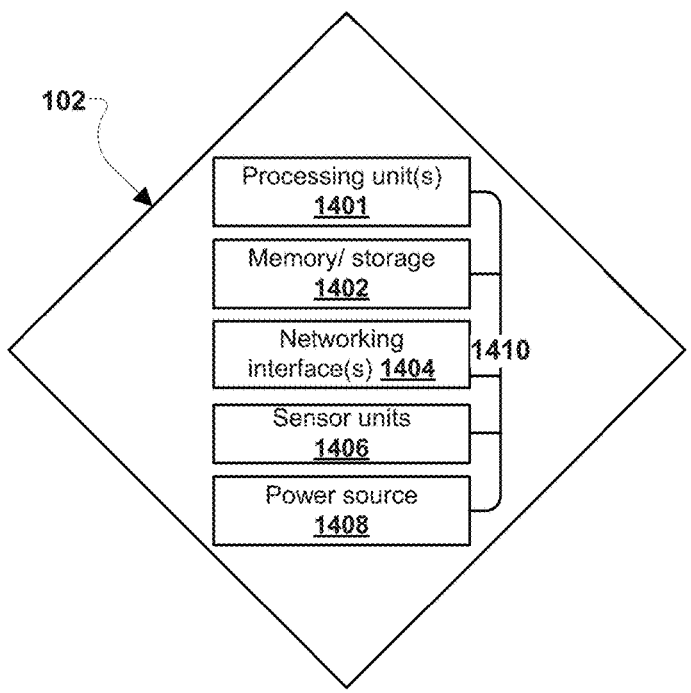
FIG. 14A is a component block diagram of a sensor node device suitable for use in various embodiments.

FIG. 14A illustrates exemplary components of a sensor node 102 suitable for use in various embodiments. Such a sensor node 102 may include a processing unit(s) 1401 (e.g., a microcontroller, a processor, etc.), a memory or storage unit 1402 (e.g., volatile memory, non-volatile memory, a hard drive, etc.), a networking interface(s) 1404 (e.g., a radio frequency transceiver and antenna, an Ethernet connection/port, etc.), one or more sensor units 1406 (e.g., a gas sensor, a microphone, a camera, an ambient light sensor, etc.), and a power source 1408 (e.g., a power connection, a battery, etc.). Each of the components 1401-1408 may be coupled together or other accessible to one another via a bus 1410 or other similar connectivity. In some embodiments, the connections between the components 1401-1408 may be accomplished via a wireless connection (e.g., RF communications, etc.).

Figure 14B:
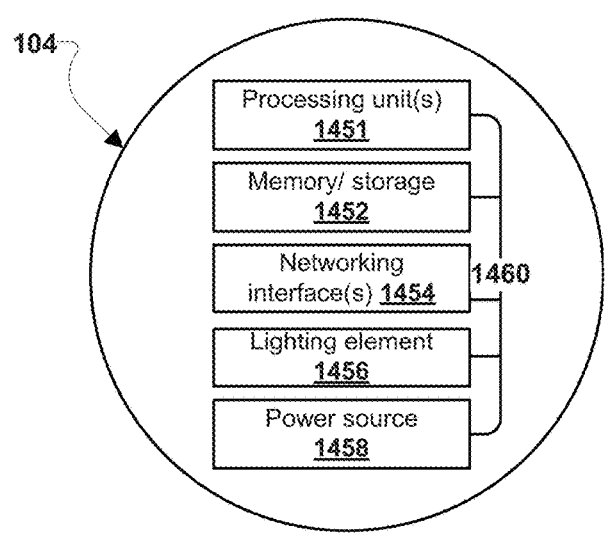
FIG. 14B is a component block diagram of a lighting node device suitable for use in various embodiments.

FIG. 14B illustrates exemplary components of a lighting node 104 suitable for use in various embodiments. Such a lighting node 104 may include a processing unit(s) 1451 (e.g., a microcontroller, a processor, etc.), a memory or storage unit 1452 (e.g., volatile memory, non-volatile memory, a hard drive, etc.), a networking interface(s) 1454 (e.g., a radio frequency transceiver and antenna, an Ethernet connection/port, etc.), a lighting element 1456 (e.g., one or more LEDs, a light bulb, etc.), and a power source 1458 (e.g., a power connection, a battery, etc.). Each of the components 1451-1458 may be coupled together or other accessible to one another via a bus 1460 or other similar connectivity. In some embodiments, the connections between the components 1451-1458 may be accomplished via a wireless connection (e.g., RF communications, etc.).

Various forms of computing devices, including personal computers, mobile computing devices (e.g., smartphones, etc.), servers, laptop computers, etc., may be used to implement the various embodiments. An exemplary server computing device 140 suitable for use in various embodiments may typically include, at least, the components illustrated in FIG. 15. Such a server computing device 140 may typically include a processor 1501 coupled to volatile memory 1502 and a large capacity nonvolatile memory, such as a disk drive 1503. The server computing device 140 may also include a floppy disc drive, compact disc (CD) or DVD disc drive 1506 coupled to the processor 1501. The server computing device 140 may also include network access ports 1504 (or interfaces) coupled to the processor 1501 for establishing data connections with a network 1505, such as the Internet and/or a local area network coupled to other system computers and servers.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a computing device to generate lighting control commands for lighting nodes of a lighting system associated with a lighting infrastructure, comprising:
    obtaining, by a processor of the computing device, a plurality of lighting model outputs generated by lighting control algorithms that utilize sensor data obtained from one or more sensor nodes within the lighting infrastructure;
    combining, by the processor, the plurality of lighting model outputs in an additive fashion to generate a composited lighting model;
    calculating, by the processor, lighting parameters for a lighting node within the lighting infrastructure based on the composited lighting model and other factors; and
    generating, by the processor, a lighting control command for configuring the lighting node within the lighting infrastructure using the calculated lighting parameters;
    determining, by the processor, whether a sample time has expired, and wherein
    combining, by the processor, the plurality of lighting model outputs in the additive fashion to generate the composited lighting model comprises combining, by the processor, the plurality of lighting model outputs in the additive fashion to generate the composited lighting model in response to determining the sample time has expired, and wherein
    calculating by the processor, lighting parameters for the lighting node within the lighting infrastructure based on the composited lighting model and the other factors comprises calculating, by the processor, lighting parameters for the lighting node within the lighting infrastructure based on the composited lighting model and the other factors in response to determining the sample time has expired.

2. The method of claim 1, wherein the plurality of lighting model outputs are received from other devices associated with the lighting system.

3. The method of claim 1, further comprising:
    receiving, by the processor, the sensor data obtained from the one or more sensor nodes within the lighting infrastructure; and
    performing, by the processor, the lighting control algorithms using the received sensor data to generate the plurality of lighting model outputs.

4. The method of claim 1, wherein each of the plurality of lighting model outputs indicates an ideal lighting within the lighting infrastructure with relation to a particular objective.

5. The method of claim 4, wherein the particular objective comprises one or more of directed lighting, path routing, and presence detection.

6. The method of claim 4, wherein each of the plurality of lighting model outputs indicates an ideal lighting within the lighting infrastructure over a period of time with relation to the particular objective.

7. The method of claim 1, wherein combining, by the processor, the plurality of lighting model outputs in the additive fashion to generate the composited lighting model comprises combining, by the processor, mathematical representations of each of the plurality of lighting model outputs.

8. The method of claim 1, wherein combining, by the processor, the plurality of lighting model outputs comprises using, by the processor, light blending techniques.

9. The method of claim 1, wherein the lighting control command indicates a luminosity level to be used at the lighting node, wherein the luminosity level is a luminosity configuration inclusively between no luminosity and full luminosity.

10. The method of claim 1, wherein the other factors include a location for the lighting node within the lighting infrastructure and a time.

11. The method of claim 10, wherein calculating, by the processor, the lighting parameters for the lighting node within the lighting infrastructure based on the composited lighting model and the other factors comprises comparing, by the processor, the location for the lighting node to the composited lighting model to identify a sampled value for the lighting node.

12. The method of claim 1, further comprising syncing, by the processor, the plurality of lighting model outputs in time.

13. The method of claim 1, further comprising transmitting, by the processor, the generated lighting control command to the lighting node.

14. The method of claim 1, wherein the computing device is one of a remote server, the lighting node, a sensor node, or a local computing device within the lighting infrastructure.

15. The method of claim 14, wherein the computing device is the lighting node, the method further comprising configuring, by the processor, a local lighting element based on the generated lighting control command.

16. The method of claim 1, wherein obtaining, by the processor of the computing device, the plurality of lighting model outputs generated by the lighting control algorithms that utilize the sensor data obtained from the one or more sensor nodes within the lighting infrastructure comprises one or more of:
    updating, by the processor, one or more of the plurality of lighting model outputs;
    removing, by the processor, one or more of the plurality of lighting model outputs; and
    adding, by the processor, one or more new lighting model outputs.

17. The method of claim 16, wherein obtaining, by the processor of the computing device, the plurality of lighting model outputs generated by the lighting control algorithms that utilize the sensor data obtained from the one or more sensor nodes within the lighting infrastructure comprises:
    determining, by the processor, whether a first lighting model output of the plurality of lighting model outputs has an indefinitely null value; and
    removing, by the processor, the first lighting model output from the plurality of lighting model outputs in response to determining the first lighting model output has the indefinitely null value.

18. A system, comprising:
    a computing device comprising a processor configured with processor-executable instructions for performing operations comprising:
    obtaining a plurality of lighting model outputs generated by lighting control algorithms that utilize sensor data obtained from one or more sensor nodes within a lighting infrastructure;

combining the plurality of lighting model outputs in an additive fashion to generate a composited lighting model;

calculating lighting parameters for a lighting node within the lighting infrastructure based on the composited lighting model and other factors; and generating a lighting control command for configuring the lighting node within the lighting infrastructure using the calculated lighting parameters, the system further comprising:

the one or more sensor nodes within the lighting infrastructure, wherein each of the one or more sensor nodes includes a first processing unit configured with processor-executable instructions for performing operations comprising:

obtaining the sensor data related to the lighting infrastructure; and transmitting the obtained sensor data for use by the computing device, the system further comprising:

one or more lighting nodes within the lighting infrastructure, wherein the lighting node is within the one or more lighting nodes, wherein the lighting node of the one or more lighting nodes includes a second processing unit configured with processor-executable instructions for performing operations comprising:

receiving the generated lighting control command; and configuring a lighting element based on the received lighting control command.

* * * * *